United States Patent [19]

Lawson et al.

[11] Patent Number: 4,561,730
[45] Date of Patent: Dec. 31, 1985

[54] SYNTHETIC RESIN LENS SYSTEM FOR IMAGING APPARATUS

[75] Inventors: John A. Lawson, Dayton, Ohio; Manfred R. Kuehnle, New London, N.H.; Joseph D. Knox, Centerville, Ohio

[73] Assignee: Coulter Systems Corporation, Bedford, Mass.

[21] Appl. No.: 431,577

[22] Filed: Sep. 30, 1982

[51] Int. Cl.[4] .............................. G02B 9/36
[52] U.S. Cl. .............................. 350/432; 350/470
[58] Field of Search .............................. 350/432, 470

[56] References Cited

U.S. PATENT DOCUMENTS

| 3,507,560 | 4/1970 | Baker | 350/470 |
| 4,015,897 | 4/1977 | Konoma et al. | 350/470 |
| 4,236,807 | 12/1980 | Kuehnle | 355/3 R |
| 4,264,199 | 4/1981 | Kuehnle | 355/66 |
| 4,285,579 | 8/1981 | Yamada | 350/470 |

Primary Examiner—John K. Corbin
Assistant Examiner—Rebecca D. Gass
Attorney, Agent, or Firm—Silverman, Cass & Singer, Ltd.

[57] ABSTRACT

A unitary magnification lens system for an electrophotographic imaging system including a folded optical system is made of synthetic resin. It has an f/5.6 aperture for increased light gathering power to ease the requirements of the imaging system illumination system and a moderately wide field angle of 64° to image documents of up to $8\frac{1}{2} \times 14$ inches at a time. The lens system is non-vignetting and includes aspherical surfaces on its four elements, arranged in two pairs, that deviate to as much as the tenth order from the conic.

21 Claims, 5 Drawing Figures

| F= 168.46 | f= 5.6 | F.A. = 64° | | |
|---|---|---|---|---|
| LENS | RADII | SPACE AND THICKNESS | Nd | Vd |
| I | $R_1=+33.23$<br>$R_2=+82.88$ | $T_1 = 17.47$ | 1.492 | 57.4 |
| | | $S_1 = 0.20$ | | |
| II | $R_3=+46.98$<br>$R_4=+27.84$ | $T_2 = 5.00$ | 1.585 | 29.9 |
| | | $S_2 = 11.88$ | | |
| STOP | | | | |
| | | $S_3 = 11.88$ | | |
| III | $R_5=-27.84$<br>$R_6=-46.98$ | $T_3 = 5.00$ | 1.585 | 29.9 |
| | | $S_4 = 0.20$ | | |
| IV | $R_7=-82.88$<br>$R_8=-33.23$ | $T_4 = 17.47$ | 1.492 | 57.4 |

ALL SCALAR QUANTITIES GIVEN IN MILLIMETERS

SYNTHETIC RESIN LENS SYSTEM FOR IMAGING APPARATUS

BACKGROUND OF THE INVENTION

This invention relates generally to imaging lens systems used in electrophotographic copy devices reproducing images on plain paper and more particularly relates to imaging lens systems used in inexpensive, small, lightweight electrophotographic devices providing high quality copies.

Electrophotographic imaging apparatus such as copying machines are well known in the art. Generally, these machines include an electrophotographic member that is transported past or through a closed-loop series of work stations. The work stations comprise a charging station at which a uniform charge is placed on the photoconductive surface of the electrophotographic member, an exposure station at which the charged surface is exposed to a light image of the document to be reproduced or copied to form thereon a latent electrostatic image of the document, a developing station at which the latent image is developed or made visible by the application of finely divided toner particles that adhere to the member surface according to the latent image configuration and a transfer station at which the toned image is transferred to a record medium or secondary carrier material such as paper.

It is desired to make such a copying machine inexpensive, small, and lightweight, yet producing high quality copies. These requirements have been though to be difficult to attain. A copying machine that achieves these advantages is disclosed, however in U.S. Pat. No. 4,236,807.

It has been determined advantageous in that patent to employ an electrophotographic member in the form of an endless belt mounted on a plurality of rollers and to expose the member to the light image of the document to be copied at a location where the belt is in a flat condition. The light image of the document is projected onto the belt through an optical system that advantageously uses a folded optical path. Such a folded path optical system requires reduced space interior of the copier cabinet and contributes to the desired requirement of a small copier.

The folded path optical system comprises a horizontally disposed, transparent copy or object platen, an illumination system of lamps and reflectors for illuminating the platen, a first right-angle folding mirror disposed below the platen, a lens system aligned laterally of the first folding mirror and a second right-angle folding mirror aligned laterally of the lens system below the exposure station for the electrophotographic member. The object platen and exposure station thus are arranged laterally of one another in substantially parallel planes with the folded optical path therebelow. This is disclosed in U.S. Pat. No. 4,264,199 which further discloses a unitary mounting structure to mount in alignment the various optical system components.

The optical system provides, gathers and transmits light energy reflected from the original document to the electrophotographic member to form the latent electrostatic image thereon. The light image of the document must be of a sufficient quantity fully to discharge areas of the charged member and must be of a high quality to provide a clear, crisp reproduction. The illuminating means thus must provide sufficient light energy evenly distributed across the surface of the copy platen and the lens system must gather and transmit a sufficient quantity of the light image reflected from the document with a sufficient clarity to form the desired latent image on the member.

These requirements have been difficult to satisfy with conventional lens systems, an example of which is disclosed in U.S. Pat. No. 3,507,560 to Baker.

U.S. Pat. No. 3,507,560 discloses a 1:1 magnification, moderately wide 60° field angle lens having an aperture with an f-number of f/11.0. It uses glass stock of medium refractive index and uses four lens elements having mild surface curvatures to attain an acceptably low cost lens system.

Conventional lenses of this range of field angles are well corrected for aberrations only up to apertures of about f/11.0.

Use of such conventional lens systems requires a larger than desired illumination system to provide excessive light at the object platen for insuring the projection of a sufficient quantity of light to the exposure station. The disproportionately large, expensive and heavy illumination system is required due to the low light gathering power of a lens system having an f/11.0 aperture. The size, cost and weight of the illumination system results not only from the lamps but also from the electrical power supply required to energize the lamps at closely spaced intervals to obtain high speed copying. Further, it is difficult to distribute the large quantity of light energy evenly across the object platen.

It has been determined that a lens system with an aperture having a much lower f-number of such as 5.6 would significantly transmit more light energy to the work station by about a factor of four, easing the requirements of the illumination system and improving overall system performance.

Such a moderate aperture lens system must maintain its cost proportionate to the remainder of the copying machine and be well corrected for aberrations to maintain copy quality.

These requirements might point toward production using the techniques of injection molding optical plastic or resinous materials. The optical plastic materials available, however, are considerably lower in refractive index than the glass materials used in conventional lens systems demanding that the lens elements be specially designed to correct for aberrations Further, the lens system must be easy to assemble and install so that unskilled labor may be used to reduce costs.

Additionally, the lens system should be non-vignetted. A vignetted lens system will transmit decreasing quantities of light energy from the center of the object and moving towards the edges of the object. Thus a vignetted lens system will transmit less light energy from the edges of an object than from the center of that object. In photocopier applications, this vignetting can be corrected by providing increased illumination energy at the fringes of the object platen. This can be difficult to achieve, however, especially where high intensity illumination is required at the center of the object platen.

Heretofore it has not been deemed commercially feasible to achieve a lens system which obviates the disadvantages stated above. The invention herein succeeds in achieving this end.

SUMMARY OF THE INVENTION

In accordance with the invention an electrophotographic copying machine having a folded optical train is provided with a lens system that has a moderate aperture of f/5.6 and a moderately wide field angle of 64°, is achromatic for the wavelength from 436 nm to 520 nm and is corrected for chromatic variation of spherical aberration and astigmatism.

The lens system comprises two pairs or groups of lens elements symmetrically formed and spaced apart on either side of a centrally located stop or aperture plate. Each pair of elements has at least two element surfaces that are aspherical with the aspherical surfaces having as much as a tenth order deformation from the conic.

The lens element material is optical plastic or synthetic resin and the lens elements are mounted in a barrel-shaped plastic holder to facilitate production assembly with unskilled labor. The holder is readily mounted in a unitary mounting component to align the lens system with the folded path of the copier optical system.

The lens system finds particular utility with a folded path optical system of an electrophotographic copying machine but also can find utility wherever a moderately wide field angle lens system is required to provide good light gathering ability and high quality images.

DESCRIPTION OF THE PREFERRED EMBODIMENT

The photocopier device system problem of having a large, heavy and disproportionately costly illumination system for use in conjunction with a conventional imaging lens system is solved by providing a new lens system having a larger aperture. This lessens the requirements of the illumination system and provides for the entire system to be smaller, lighter and less costly. The new lens system is rendered inexpensive by mass manufacture techniques of injection molding optical plastics.

Figure 1:
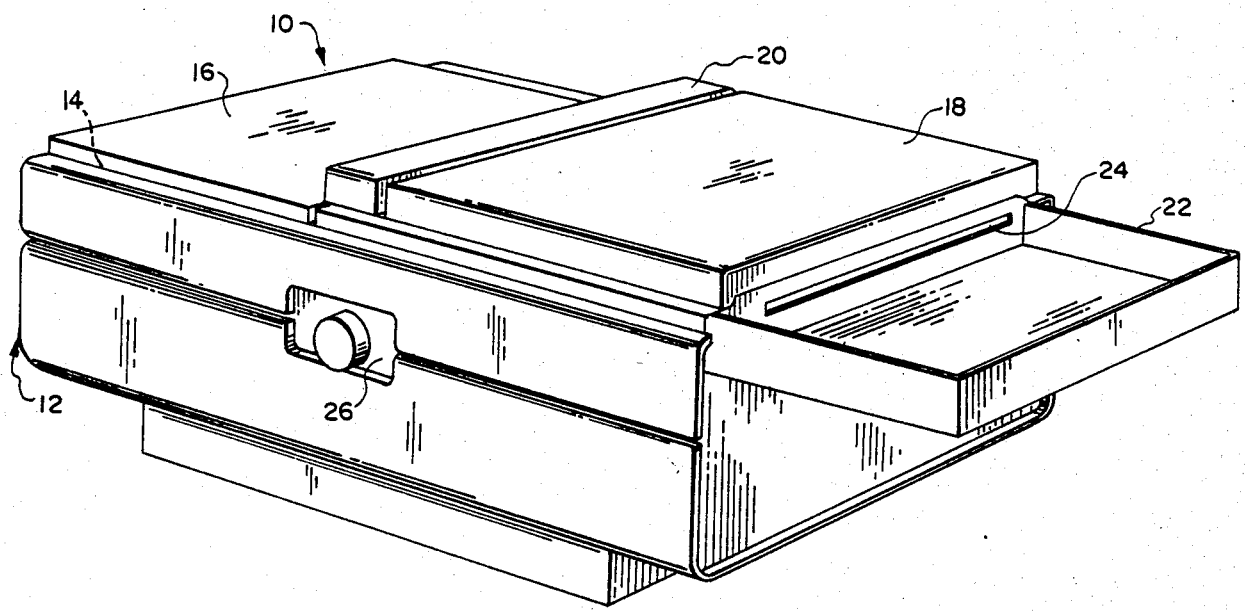
FIG. 1 is a perspective view of an electrophotographic copying machine of the invention.

Referring to the drawings, in FIG. 1 there is illustrated an electrophotographic copying device or machine designated generally by the reference character 10. Copying machine 10 includes a cabinet 12, a copy or object platen 14, a platen cover 16, a paper supply cover 18, a control panel 20, a copy delivery tray 22, a copy delivery slot 24 and a toning device 26 which may include a removable cartridge.

Figure 2:
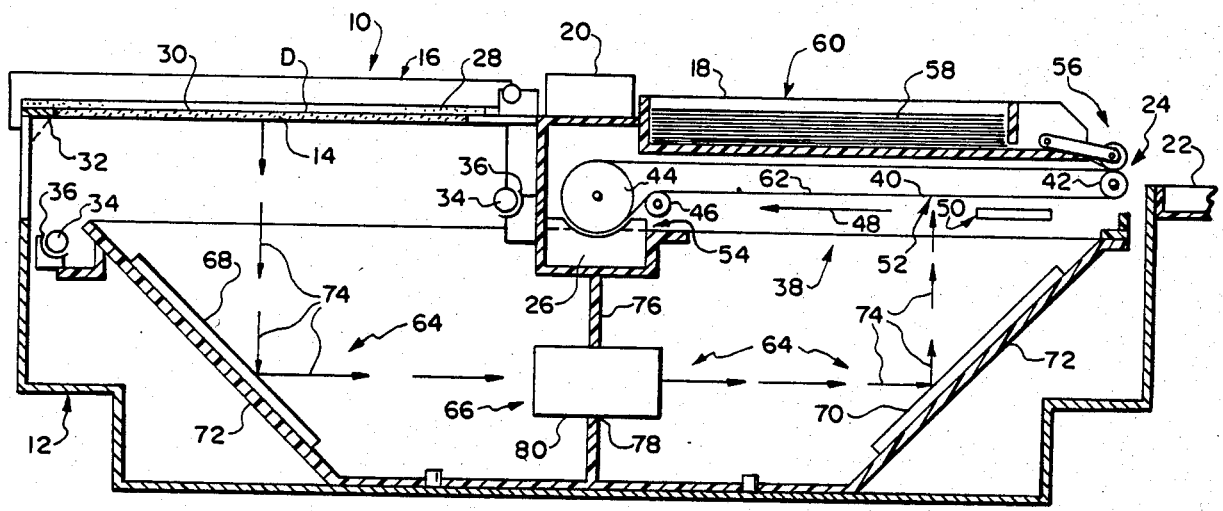
FIG. 2 is a median sectional view of the copying machine of the invention illustrating the elements of the copier.

In FIG. 2, the original document D to be copied or reproduced is placed on top of transparent object platen 14 and cover 16 is rotated down on top of both platen 14 and document D. Cover 16 may be provided with a conformable means 28 such as a foamed material to insure document D is closely engaged against the top surface 30 of platen 14. Platen 14 is carried by frame 32 of the cabinet 12.

Platen 14 is illuminated by illumination means including a pair of lamps 34 and a pair of reflectors 36. The electrical power supply for energizing the lamps and control means of the illumination means are not shown but are contained interior of cabinet 12.

An electrophotographic imaging assembly 38 includes an electrophotographic belt 40 carried on rollers 42 and 44 and positioned by guide roller 46.

Roller 44 is a driven roller, being connected to drive means such as a motor (not shown). Belt 40 moves in the direction indicated by arrow 48 past a series of work stations in a closed-loop manner.

The term "electrophotographic belt" used herein refers to or describes an endless belt or web that has a portion which is electrophotographic in character. This portion has a photoconductive coating formed on a conductive substrate.

Belt 40 first is directed to charging station 50 where the surface of the photoconductive coating of the belt 40 is uniformly charged. The belt next is directed to exposure station 52 where the charged photoconductive coating is exposed to a light image of the document D forming a latent electrical image of the document D on the belt.

The belt 40 then is directed to the development or toning station 54 where the latent electrostatic image is developed by interaction with toner carried by the toner device 26. The belt 40 lastly travels to transfer station 56 where the toned image is transferred to a record medium or a secondary carrier medium such as a sheet of plain paper 58 supplied from supply station 60.

The exposure station 52 is located along a planar reach 62 of belt 40. Rollers 42, 44 and 46 are positioned so that the planar reach 52 is in a plane parallel to the top surface 30 of platen 14 but offset therefrom. The belt 40 is arranged on rollers 42, 44 and 46 with the photoconductive coating being on the outer circumference of the belt and facing downward at the exposure station 52.

The light image of document D is projected from the object 14 onto belt 40 at exposure station 52 by means of an optical projection system 64.

Optical projection system 64 comprises in optical alignment a lens system 66 and a pair of planar reflection means such as mirrored surfaces or mirrors 68 and 70 set at 45° angles to the object platen 14 and exposure station 52. Lens system 66 is positioned midway between mirrors 68 and 70. Lens system 66 and mirrors 68 and 70 are mounted on a basket-like mounting or support member 72 that is seated within cabinet 12 so that the image of document D is projected to belt 40 along the folded optical path indicated by arrows 74.

Lens system 66 in particular is mounted on a partition 76 of support member 72 through an opening 78 therein and is fixed thereto by any suitable means (not shown). For example, partition 76 may be provided with a half-moon shaped cut-out that receives the lens system 66 and a conformably shaped top piece, the whole assembly being fixed together by an adhesive cement.

Figures 3, 4:
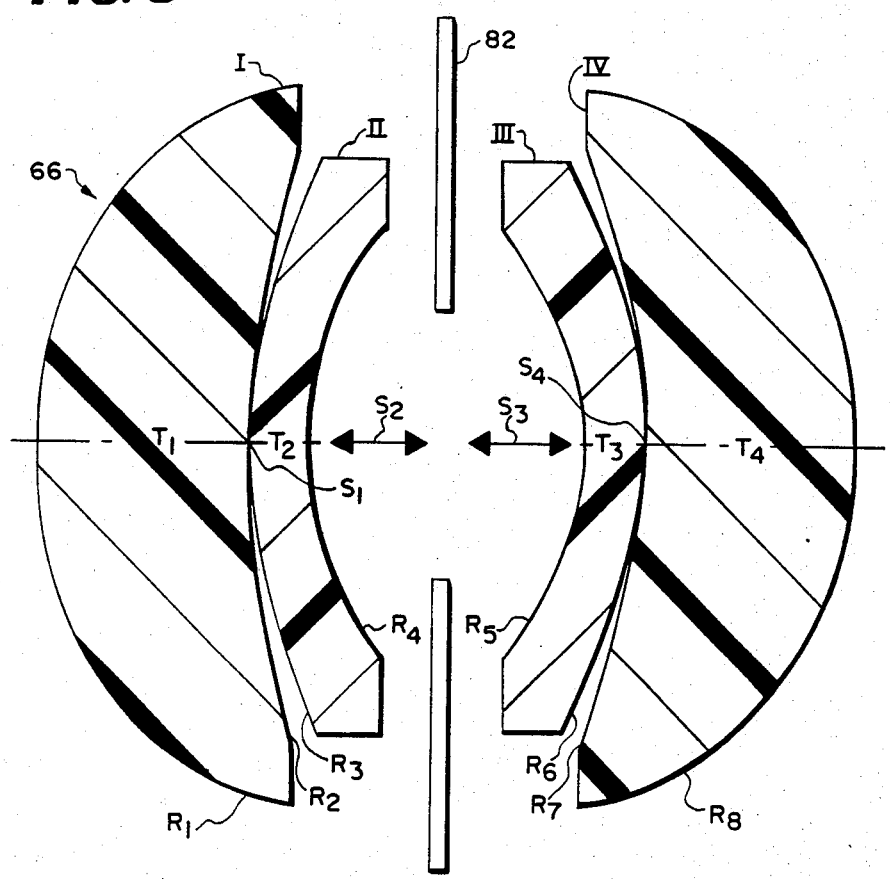
FIG. 3 is a median sectional view of the elements of the lens system of the invention through and containing the optical axis.
FIG. 4 is a table of parameters of the elements of a preferred embodiment of the lens system.

In FIG. 3, the lens system 66 without the housing 80 is shown to comprise four axially aligned single element components identified as I, II, III and IV. These elements are arranged symmetrically disposed in two pairs upon opposite sides of a centrally located space. The pairs of elements are separated from one another on opposite sides of this space a distance sufficient to accommodate a stop or aperture plate 82. The pairs of elements are symmetrically formed and are airspaced.

From left to right in FIG. 3 along the optical axis, the lens system comprises a first positive element I having a thickness $T_1$ and radii $R_1$ and $R_2$. Element I is spaced a distance $S_1$ from a second negative element II having a thickness $T_2$ and radii $R_3$ and $R_4$. Element II is spaced a distance $S_2$ from plate 82. The plate 82 is spaced a distance $S_3$ from a third negative element III having a thickness $T_3$ and radii $R_5$ and $R_6$. The element III is spaced a distance $S_4$ from a fourth positive element IV having a thickness $T_4$ and radii $R_7$ and $R_8$.

The parameters for the element thicknesses T, radii R, spacings S, indices of refraction $n_d$, Abbe numbers $V_d$, focal length F, aperture f/ and field angle F.A. for a preferred embodiment of the invention are given in the following table which also is reproduced as FIG. 4. The dimensions in the tables are stated in terms of millimeters.

TABLE I

| LENS | RADII | SPACE AND THICKNESS | Nd | Vd |
|---|---|---|---|---|
| | F = 168.46 | f/5.6 | F.A. = 64° | |
| I | $R_1$ = +33.23 | $T_1$ = 17.47 | 1.492 | 57.4 |
| | $R_2$ = +82.88 | | | |
| | | $S_1$ = 0.20 | | |
| II | $R_3$ = +46.98 | $T_2$ = 5.00 | 1.585 | 29.9 |
| | $R_4$ = +27.84 | | | |
| | | $S_2$ = 11.88 | | |
| STOP | | | | |
| | | $S_3$ = 11.88 | | |
| III | $R_5$ = −27.84 | $T_3$ = 5.00 | 1.585 | 29.9 |
| | $R_6$ = −46.98 | $S_4$ = 0.20 | | |
| IV | $R_7$ = −82.88 | $T_4$ = 17.47 | 1.492 | 57.4 |
| | $R_8$ = −33.23 | | | |

The lens surface of element I described by radius $R_1$ is aspheric, with its equation being:

$$X = \frac{Y^2}{33.23 + 33.23\sqrt{1 - 1.149\left[\frac{Y}{33.23}\right]^2}} + AY^4 + BY^6 + CY^8 + DY^{10}$$

Where
A = −1.461×10⁻⁸,
B = +3.267×10⁻¹⁰,
C = −3.611×10⁻¹³,
D = +3.205×10⁻¹⁶,
X represents a distance in the advancing direction of the ray on the optical axis, and
Y represents a distance in the direction perpendicular to the X direction.

The lens surface of element II described by radius $R_4$ is also aspheric, with its equation being:

$$X = \frac{Y^2}{27.84 + 27.84\sqrt{1 - 1.718\left[\frac{Y}{27.84}\right]^2}} + AY^4 + BY^6 + CY^8 + DY^{10}$$

Where:
A = −8.482×10⁻⁷,
B = −2.176×10⁻¹⁰,
C = −2.693×10⁻¹²,
D = +1.156×10⁻¹⁵,
X is as before, and
Y is as before.

The surfaces described by radii $R_4$ and $R_5$ are mirror images of one another and the surfaces described by radii $R_1$ and $R_8$ are mirror images of one another.

Lens elements I and IV are made of an acrylic material, specifically, polymethylmethacrylate. Elements II and III are made of a polycarbonate material.

The aspheric curves of the surfaces described by radii $R_1$, $R_4$, $R_5$ and $R_8$ overcome the low index of refraction of the plastic materials of the lens elements. In the preferred embodiment these surfaces represent a 10th order deformation from the conic. In later described embodiments of the invention, these surfaces approach and become pure conic.

The described lens system also compensates for the astigmatism introduced by the 6 millimeter thick plate-glass platen that receives the original document.

The design provides an achromatic lens system for the wavelengths 436 nanometers to 520 nanometers and is also corrected for chromatic variation of spherical aberration and astigmatism. The design is also as good as other designs for glass material elements in its color correction.

The parameters of a second embodiment of the invention are set forth in Table II, following:

TABLE II

| LENS | RADII | SPACE AND THICKNESS | Nd | Vd |
|---|---|---|---|---|
| | F = 168 | f/5.6 | F.A. = 64° | |
| I | $R_1$ = +29.46 | $T_1$ = 14.80 | 1.492 | 57.4 |
| | $R_2$ = +60.02 | | | |
| | | $S_1$ = .05 | | |
| II | $R_3$ = +38.06 | $T_2$ = 3.79 | 1.585 | 29.9 |
| | $R_4$ = +24.51 | | | |
| | | $S_2$ = 12.62 | | |
| STOP | | | | |
| | | $S_3$ = 12.62 | | |
| III | $R_5$ = −24.51 | $T_3$ = 3.79 | 1.585 | 29.9 |
| | $R_6$ = −38.06 | | | |
| | | $S_4$ = .05 | | |
| IV | $R_7$ = −60.02 | $T_4$ = 14.80 | 1.492 | 57.4 |
| | $R_8$ = −29.46 | | | |

The surface described by radius $R_1$ is aspheric, with its equation being:

$$X = \frac{Y^2}{29.46 + 29.46\sqrt{1 - 1.177\left[\frac{Y}{29.46}\right]^2}} + AY^4 + BY^6$$

Where:
A = +6.397×10⁻⁹,
B = −7.748×10⁻¹¹,
X is as before, and
Y is as before.

The surface described by radius $R_4$ is aspheric, with the equation being:

$$X = \frac{Y^2}{24.51 + 24.51\sqrt{1 - 1.692\left[\frac{Y}{24.51}\right]^2}} + AY^4 + BY^6$$

Where:
A = −1.3497×10⁻⁶,
B = −5.004×10⁻⁹,
X and Y are as before.

The surfaces described by radii $R_4$ and $R_5$ are mirror images of one another as are the surfaces described by the radii $R_1$ and $R_8$.

The parameters of a third embodiment of the invention are set forth in Table III following:

TABLE III

| LENS | RADII | SPACE AND THICKNESS | Nd | Vd |
|---|---|---|---|---|
| | | F = 168    f/5.6    F.A. = 64° | | |
| I | $R_1 = +27.80$ | $T_1 = 14.80$ | 1.492 | 57.40 |
| | $R_2 = +63.30$ | | | |
| | | $S_1 = .05$ | | |
| II | $R_3 = +41.68$ | $T_2 = 3.09$ | 1.590 | 30.9 |
| | $R_4 = +24.45$ | | | |
| | | $S_2 = 10.93$ | | |
| STOP | | $S_3 = 10.93$ | | |
| III | $R_5 = -24.45$ | $T_3 = 3.09$ | 1.590 | 30.9 |
| | $R_6 = -41.68$ | | | |
| | | $S_4 = .05$ | | |
| IV | $R_7 = -63.30$ | $T_4 = 14.80$ | 1.492 | 57.4 |
| | $R_8 = -27.80$ | | | |

The surface described by radius $R_1$ is aspheric with the equation being:

$$X = \frac{Y^2}{27.80 + 27.80\sqrt{1 - 1.209\left[\frac{Y}{27.80}\right]^2}} + AY^4 + BY^6$$

Where:
A = +3.215×10⁻⁸,
B = −3.603×10⁻¹¹, and
X and Y are as before.

The surface described by radius $R_4$ is aspheric with the equation being:

$$X = \frac{Y^2}{24.45 + 24.45\sqrt{1 - 1.881\left[\frac{Y}{24.51}\right]^2}} + AY^4 + BY^6$$

Where:
A = −1.398×10⁻⁶,
B = −6.45×10⁻⁹, and
X and Y are as before.

The surfaces described by radii $R_4$ and $R_5$ are mirror images of one another as are the surfaces described by radii $R_1$ and $R_8$.

The material of elements I and IV again are acrylic while the material of elements II and II is polystyrene.

The parameters of a fourth embodiment of the invention are set forth in Table IV, following:

TABLE IV

| LENS | RADII | SPACE AND THICKNESS | Nd | Vd |
|---|---|---|---|---|
| | | F = 168    f/5.6    F.A. = 64° | | |
| I | $R_1 = +27.46$ | $T_1 = 14.00$ | 1.492 | 57.4 |
| | $R_2 = +78.10$ | | | |
| | | $S_1 = .50$ | | |
| II | $R_3 = +47.01$ | $T_2 = 3.51$ | 1.590 | 30.9 |
| | $R_4 = +25.61$ | | | |
| | | $S_2 = 8.65$ | | |
| STOP | | | | |
| | | $S_3 = 8.65$ | | |
| III | $R_5 = -24.61$ | $T_3 = 3.51$ | 1.590 | 30.9 |
| | $R_6 = -47.01$ | | | |
| | | $S_4 = .50$ | | |
| IV | $R_7 = -78.10$ | $T_4 = 14.00$ | 1.492 | 57.4 |
| | $R_8 = -27.46$ | | | |

TABLE IV-continued

| LENS | RADII | SPACE AND THICKNESS | Nd | Vd |
|---|---|---|---|---|
| | | F = 168    f/5.6    F.A. = 64° | | |

The surface described by radius $R_1$ is aspheric with the describing equation being:

$$X = \frac{Y^2}{27.46 + 27.46\sqrt{1 - 1.243\left[\frac{Y}{27.46}\right]^2}}$$

The surface described by radius $R_2$ is aspheric with the describing equation being:

$$X = \frac{Y^2}{78.10 + 78.10\sqrt{1 - 5.241\left[\frac{Y}{78.10}\right]^2}}$$

The surface described by radius $R_3$ is aspheric with the describing equation being:

$$X = \frac{Y^2}{47.01 + 47.01\sqrt{1 - 2.333\left[\frac{Y}{47.01}\right]^2}}$$

The surface described by radius $R_4$ is aspheric with the describing equation being:

$$X = \frac{Y^2}{24.61 + 24.61\sqrt{1 - 1.912\left[\frac{Y}{24.61}\right]^2}}$$

Where:
X and Y of the four preceding equations are as before.

The surfaces described by radii $R_1$ and $R_8$ are mirror images of one another, as are the surfaces described by radii: $R_2$ and $R_7$; $R_3$ and $R_6$; and $R_4$ and $R_5$.

The lens system 66 finds particular utility as the gathering and directing or projecting lens system in a photocopier device. In such an application it provides unitary (1:1) magnification with a moderately wide field angle of 64° and provides a clear and crisp image of the original document on the electrophotographic member. With an aperature of f/5.6, lens system 66 transmits four times the light radiant energy to the electrophotographic member than does a lens having an aperture of f/11.0.

The cost of the lens system remains proportionate to the cost of the entire photocopier through the use of mass production techniques of precision injection molding optical plastic materials.

The primary reason for the aspherical lens surfaces is to correct for oblique spherical off-axis aberrations while retaining spherical on-axis aberration correction and correcting for astigmatism.

Another feature of the lens system of the invention is that the disclosed lens system is non-vignetted. The lens system uniformly collects and projects light from the corners of the object platen or document to the exposure station, easing the requirements of the illumination system. This non-vignetting is achieved as a result of the high state of correction of the lens system. In particular, the excellent oblique spherical correction provided by the lens makes it possible for the lens system to be non-vignetted. This feature of the lens system provides a field of about eight by fourteen inches (8"×14") on the object platen that is free of vignetting.

Figure 5:
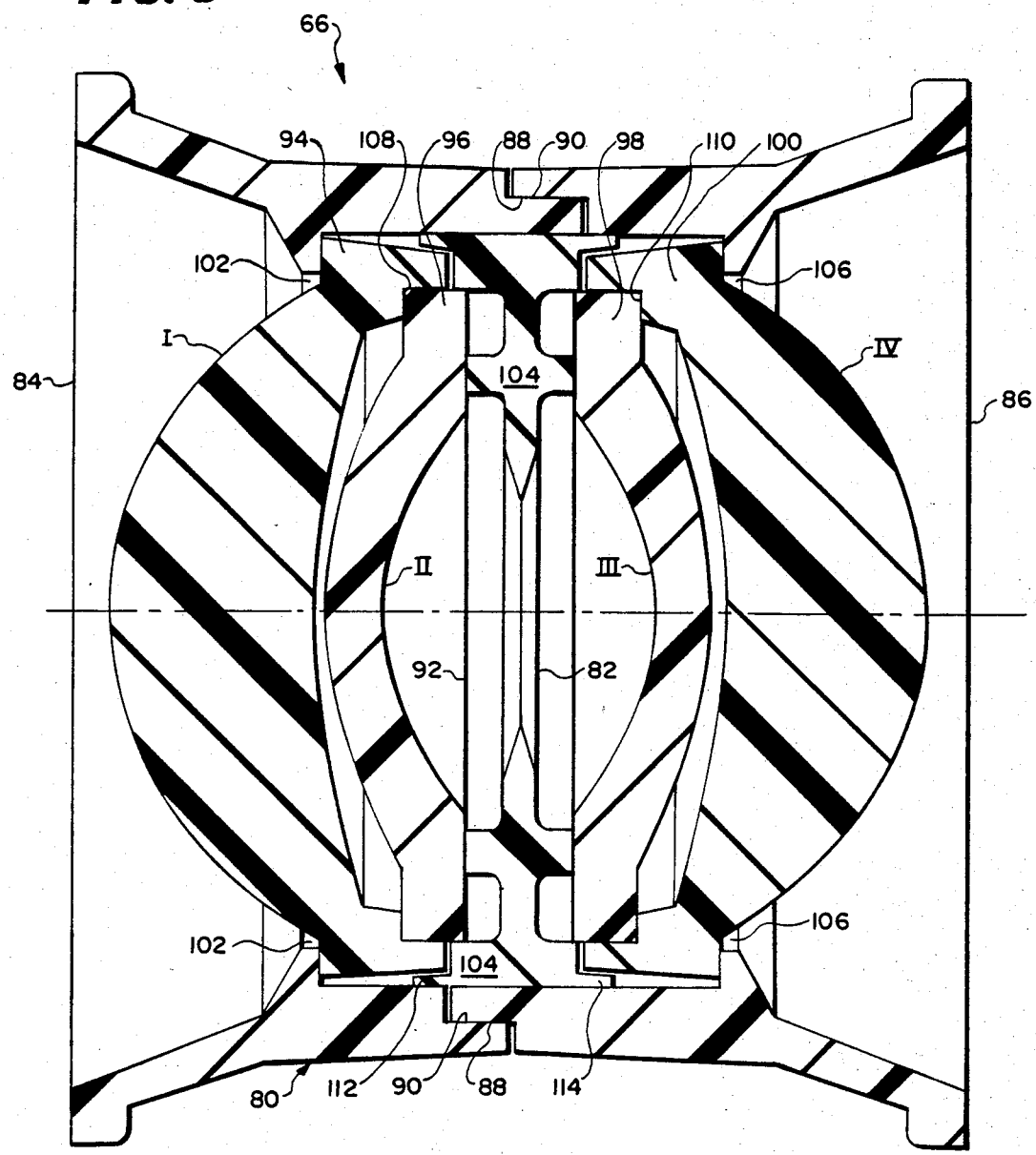
FIG. 5 is a median sectional view of the assembled lens system including a holder.

In FIG. 5 lens system 66 is shown in cross section in its assembled form. Housing 80 includes a pair of housing components 82 and 84 that are joined together at their mating surfaces 86 and 88 by any suitable joining means such as an adhesive cement. Spacer 90 providing aperture plate 82 forms a portion of the housing 80 and is centrally located between the pairs of lens elements I, II and III, IV.

Lens elements I, II, III and IV are provided, respectively, with marginal flanges 94, 96, 98 and 100. When the lens system 66 is fully assembled, as shown, flanges 94 and 96 abut one another and are sandwiched between flange 102 of component 84 and a marginal portion 104 of spacer 92 while flanges 100 and 98 abut one another and are sandwiched between flange 106 of component 86 and the marginal portion 104 of spacer 92. Flanges 94, 96, 98, 100, 102 and 106 as well as marginal portion 104 are circular in plan view along the optical axis and thus are shown both above and below the optical axis in FIG. 5.

The flanges of the lens elements are formed with the same precision as their radii of curvature so that assembly in the housing 80 results in an accurate yet inexpensive article of manufacture that may be put together by relatively unskilled labor. Of course, the spacer 92 is formed with the desired accuracy in its thickness. Components 84 and 86 and spacer 92 are formed of any suitable plastic material to provide the necessary dimensional stability for the lens system 66.

Flanges 94 and 100 include notches 108 and 110, respectively, for receiving flanges 96 and 98 therein. These notches 108 and 110 provide for the accurate centering of the lens of each pair. Spacer 92 also is provided with flanges 112 and 114 at its extreme margin or circumference. Flanges 112 and 114 mate with flanges 94 and 100 of lens elements I and IV for centering the pairs of lenses relative to one another and the housing 80. Thus, when the lens system is fully assembled and housing 80 is mounted in opening 78, all four lens elements I, II, III and IV are optically aligned with the folded optical path indicated by arrows 74 and are spaced properly from one another.

Only relatively unskilled labor having no knowledge of optics is required for all of this assembly and mounting to obtain the correct alignment and spacing. This is opposed to the skilled labor normally required to assemble a conventional lens assembly and install the lens assembly in alignment with the optical path.

The lens system of the invention may be used otherwise than as disclosed. For example, the lens system may be used anywhere that a unitary (1:1) magnification is desired with good light gathering power such as in any type of photocopier machine. Further, photocopier machines that use other than a folded optical path may use this lens system to advantage.

An advantage of using plastic material for the lens system elements and holder is that in the invention, the lens system weight is reduced over lens systems using glass elements and metal holders. This reduces the copier weight and further enhances overall system performance.

Additionally, the parameters of the lens system disclosed in the several embodiments here in may be modified as desired to maintain the large aperture while obtaining good resolution and clarity of the object document.

We claim:

1. A lens system comprising four airspaced elements arranged in two pairs symmetrically arranged on opposite sides of a central space, the elements being arranged along the optical axis as a first positive element I, a second negative element II, a third negative element III and a fourth positive element IV, the first and fourth elements being symmetrical and the second and third elements being symmetrical, the four elements being formed of plastic materials having low indices of refraction, each of the four elements having a surface that is aspheric to compensate for the low index of refraction of the element materials and the lens system providing unitary magnification, being free of vignetting, and providing an aperture of the order of f/5.6 and a field angle of the order of 64°, each element being a meniscus having its concave surface facing toward the central space, the lens surfaces being described respectively, by radii $R_1$ through $R_8$, each element having a thickness along the optical axis of, respectively, $T_1$ through $T_4$, the distance that the lens elements are spaced apart being described by the spacings $S_1$ through $S_4$ with $S_2$ and $S_3$ describing the spacings from said central space, the elements having indices of refraction $n_d$, Abbe numbers $V_d$, and the lens system having a focal length F, the parameters of said system being

| | F = 168.46 | | f/5.6 | F.A. = 64° | |
|---|---|---|---|---|---|
| LENS | RADII | | SPACE AND THICKNESS | Nd | Vd |
| I | $R_1 = +33.23$ | | $T_1 = 17.47$ | 1.492 | 57.4 |
| | $R_2 = +82.88$ | | | | |
| | | | $S_1 = 0.20$ | | |
| II | $R_3 = +46.98$ | | $T_2 = 5.00$ | 1.585 | 29.9 |
| | $R_4 = +27.84$ | | | | |
| | | | $S_2 = 11.88$ | | |
| STOP | | | | | |
| | | | $S_3 = 11.88$ | | |
| III | $R_5 = -27.84$ | | $T_3 = 5.00$ | 1.585 | 29.9 |
| | $R_6 = -46.98$ | | $S_4 = 0.20$ | | |
| IV | $R_7 = -82.88$ | | $T_4 = 17.47$ | 1.492 | 57.4 |
| | $R_8 = -33.23$ | | | | | the lens surface of element I described by radium $R_1$ being aspheric, with its equation being:

$$X = \frac{Y^2}{33.23 + 33.23\sqrt{1 - 1.149\left[\frac{Y}{33.23}\right]^2}} + AY^4 + BY^6 + CY^8 + DY^{10}$$

where
  $A = -1.461 \times 10^{-8}$,
  $B = +3.267 \times 10^{-10}$,
  $C = -3.611 \times 10^{-13}$,
  $D = +3.205 \times 10^{-16}$,
  X represents a distance in the advancing direction of a ray on the optical axis, and
  Y represents a distance in the direction perpendicular to the X direction;
the lens surface of element II described by radium $R_4$ being also aspheric, with its equation being:

$$X = \frac{Y^2}{27.84 + 27.84\sqrt{1 - 1.718\left[\frac{Y}{27.84}\right]^2}} + AY^4 + BY^6 + CY^8 + DY^{10}$$

where:
- $A = -8.482 \times 10^{-7}$,
- $B = -2.176 \times 10^{-10}$,
- $C = -2.693 \times 10^{-12}$,
- $D = +1.156 \times 10^{-15}$,
- X represents a distance in the advancing direction of a ray on the optical axis, and
- Y represents a distance in the direction perpendicular to the X direction;
- the surfaces described by radii $R_4$ and $R_5$ are mirror images of one another and the surfaces described by radii $R_1$ and $R_8$ being mirror images of one another, and
- lens elements I and IV being made of an acrylic material, specifically, polymethylmethacrylate, while elements II and III being made of a polycarbonate material.

2. Lens system comprising four airspaced elements arranged in two pairs symmetrically arranged on opposite sides of a central space, the elements being arranged along the optical axis as a dirst positive element I, a second negative element II, a third negative element III and a fourth positive element IV, the first and fourth elements being symmetrical and the second and third elements being symmetrical, the four elements being formed of plastic materials having low indices of refraction, each of the four elements having a surface that is aspheric to compensate for the low index of refraction of the element materials and the lens system providing unitary magnification, being free of vignetting, and providing an aperture of the order of f/5.6 and a field angle of the order of 64°, each element being a meniscus having its concave surface facing toward the central space, the lens surfaces being described respectively, by radii $R_1$ through $R_8$, each element having a thickness along the optical axis of, respectively, $T_1$ through $T_4$, the distance that the lens elements are spaced apart being described by the spacings $S_1$ through $S_4$ and $S_3$ describing the spacings from said central space, the elements having indices of refraction $n_d$, Abbe numbers $V_d$, and the lens system having a focal length F, the parameters of the system being

| LENS | RADII | SPACE AND THICKNESS | Nd | Vd |
|---|---|---|---|---|
| | F = 168 | f/5.6 | F.A. = 64° | |
| I | $R_1 = +29.46$ | $T_1 = 14.80$ | 1.492 | 57.4 |
| | $R_2 = +60.02$ | | | |
| | | $S_1 = .05$ | | |
| II | $R_3 = +38.06$ | $T_2 = 3.79$ | 1.585 | 29.9 |
| | $R_4 = +24.51$ | | | |
| | | $S_2 = 12.62$ | | |
| STOP | | | | |
| | | $S_3 = 12.62$ | | |
| III | $R_5 = -24.51$ | $T_3 = 3.79$ | 1.585 | 29.9 |
| | $R_6 = -38.06$ | | | |
| | | $S_4 = .05$ | | |
| IV | $R_7 = -60.02$ | $T_4 = 14.80$ | 1.492 | 57.4 |
| | $R_8 = -29.46$ | | | | the surface described by radium $R_1$ being aspheric, with its equation being:

$$X = \frac{Y^2}{29.46 + 29.46\sqrt{1 - 1.177\left[\frac{Y}{29.46}\right]^2}} + AY^4 + BY^6$$

where:
- $A = +6.397 \times 10^{-9}$,
- $B = -7.748 \times 10^{-11}$,
- X represents a distance in the advancing direction of a ray on the optical axis, and
- Y represents a distance in the direction perpendicular to the X direction; and the surface described by radius $R_4$ being aspheric, with the equation being:

$$X = \frac{Y^2}{24.51 + 24.51\sqrt{1 - 1.692\left[\frac{Y}{24.51}\right]^2}} + AY^4 + BY^6$$

where:
- $A = -1.3497 \times 10^{-6}$,
- $B = -5.004 \times 10^{-9}$, and
- X and Y are as above; and the surface described by radii $R_4$ and $R_5$ are mirror images of one another as are the surfaces described by the radii $R_1$ and $R_8$.

3. A lens system comprising four airspaced elements arranged in two pairs symmetrically arranged on opposite sides of a central space, the elements being arranged along the optical axis as a first positive element I, a second negative element II, a third negative element III and a fourth positive element IV, the first and fourth elements being symmetrical and the second and third elements being symmetrical, the four elements being formed of plastic materials having low indices of refraction, each of the four elements having a surface that is aspheric to compensate for the low index of refraction of the element materials and the lens system providing unitary magnification, being free of vignetting, and providing an aperture of the order of f/5.6 and a field angle of the order of 64°, each element being a maniscus having its concave surface facing toward the central space, the lens surfaces being described respectively, by radii $R_1$ through $R_8$, each element having a thickness along the optical axis of, element having a thickness along the optical axis of, respectively, $T_1$ through $T_4$, the distance that the lens elements are spaced apart being described by the spacings $S_1$ through $S_4$ with $S_2$ and $S_3$ describing the spacings from said central space, the elements having indices of refraction $n_d$, Abbe numbers $V_d$, and the lens system having a focal length F, the parameters of the system being

| LENS | RADII | SPACE AND THICKNESS | Nd | Vd |
|---|---|---|---|---|
| | F = 168 | f/5.6 | F.A. = 64° | |
| I | $R_1 = +27.80$ | $T_1 = 14.80$ | 1.492 | 57.40 |
| | $R_2 = +63.30$ | | | |
| | | $S_1 = .05$ | | |
| II | $R_3 = +41.68$ | $T_2 = 3.09$ | 1.590 | 30.9 |
| | $R_4 = +24.45$ | | | |
| | | $S_2 = 10.93$ | | |
| STOP | | $S_3 = 10.93$ | | |
| III | $R_5 = -24.45$ | $T_3 = 3.09$ | 1.590 | 30.9 |
| | $R_6 = -41.68$ | | | |
| | | $S_4 = .05$ | | |

-continued

| LENS | RADII | F = 168<br>SPACE AND<br>THICKNESS | f/5.6 Nd | F.A. = 64°<br>Vd |
|---|---|---|---|---|
| IV | $R_7 = -63.30$<br>$R_8 = -27.80$ | $T_4 = 14.80$ | 1.492 | 57.4 | the surface described by radius $R_1$ being aspheric with the equation being:

$$X = \frac{Y^2}{27.80 + 27.80\sqrt{1 - 1.209\left[\frac{Y}{27.80}\right]^2}} + AY^4 + BY^6$$

where:
$A = +3.215 \times 10^{-8}$,
$B = -3.603 \times 10^{-11}$,
X represents a distance in the advancing direction of a ray on the optical axis, and
Y represents a distance in the direction perpendicular to the X direction;
the surface described by radius $R_4$ being aspheric with the equation being:

$$X = \frac{Y^2}{24.45 + 24.45\sqrt{1 - 1.881\left[\frac{Y}{24.51}\right]^2}} + AY^4 + BY^6$$

where:
$A = -1.398 \times 10^{-6}$,
$B = -6.45 \times 10^{-9}$, and
X and Y are as above;
the surfaces described by radii $R_4$ and $R_5$ being mirror images of one another as are the surfaces described by radii $R_1$ and $R_8$; and
lens elements I and IV being made of an acrylic material, specifically, polymethylmeth-acrylate, while elements II and III are made of a polystyrene material.

4. A lens system comprising four airspaced elements arranged in two pairs symmetrically arranged on opposite sides of a central space, the elements being arranged along the optical axis as a first positive element I, a second negative element II, a third negative element III and a fourth positive element IV, the first and fourth elements being symmetrical and the second and third elements being symmetrical, the four elements being formed of plastic materials having low indices of refraction, each of the four elements having a surface that is aspheric to compensate for the low index of refraction of the element materials and the lens system providing unitary magnification, being free of vignetting, and providing an aperture of the order of f/5.6 and a field angle of the order of 64°, each element being a maniscus having its concave surface facing toward the central space, the lens surfaces being described respectively, by radii $R_1$ through $R_8$, each element having a thickness along the optical axis of, respectively, $T_1$ through $T_4$, the distance that the lens elements are spaced apart being described by the spacings $S_1$ through $S_4$ with $S_2$ and $S_3$ describing the spacings from said central space, the elements having indices of refraction $n_d$, Abbe numbers $V_d$, and the lens system having a focal length F, the parameters of the system being

| LENS | RADII | F = 168<br>SPACE AND<br>THICKNESS | f/5.6 Nd | F.A. = 64°<br>Vd |
|---|---|---|---|---|
| I | $R_1 = +27.46$<br>$R_2 = +78.10$ | $T_1 = 14.00$ | 1.492 | 57.4 |
|  |  | $S_1 = .50$ |  |  |
| II | $R_3 = +47.01$<br>$R_4 = +25.61$ | $T_2 = 3.51$ | 1.590 | 30.9 |
|  |  | $S_2 = 8.65$ |  |  |
| STOP |  |  |  |  |
|  |  | $S_3 = 8.65$ |  |  |
| III | $R_5 = -24.61$<br>$R_6 = -47.01$ | $T_3 = 3.51$ | 1.590 | 30.9 |
|  |  | $S_4 = .50$ |  |  |
| IV | $R_7 = -78.10$<br>$R_8 = -27.46$ | $T_4 = 14.00$ | 1.492 | 57.4 | the surface described by radius $R_1$ being aspheric with the describing equation being:

$$X = \frac{Y^2}{27.46 + 27.46\sqrt{1 - 1.243\left[\frac{Y}{27.46}\right]^2}}$$

the surface described by radius $R_2$ being aspheric with the describing equation being:

$$X = \frac{Y^2}{78.10 + 78.10\sqrt{1 - 5.241\left[\frac{Y}{78.10}\right]^2}}$$

the surface described by radius $R_3$ being aspheric with the describing equation being:

$$X = \frac{Y^2}{47.01 + 47.01\sqrt{1 - 2.333\left[\frac{Y}{47.01}\right]^2}}$$

the surface described by radius $R_4$ being aspheric with the describing equation being:

$$X = \frac{Y^2}{24.61 + 24.61\sqrt{1 - 1.912\left[\frac{Y}{24.61}\right]^2}}$$

where in the four preceding equations:
X represents a distance in the advancing direction of a ray on the optical axis; and
Y represents a distance in the direction perpendicular to the X direction; and
the surfaces described by the following radii being mirror images of one another as follows: $R_1$ and $R_8$, $R_2$ and $R_7$, $R_3$ and $R_6$ and $R_4$ and $R_5$.

5. An electrostatic imaging device comprising:
(A) an object platen adapted to receive thereon a document to be reproduced;
(B) illumination means for illuminating evenly the object platen to form a light image of the document;
(C) exposure means at which a charged member is exposed to the light image of said doeument to form thereon a latent electrostatic image of the document; and (D) a lens system for gathering and transmitting the light image of said document from said object platen to said exposure station, said lens system comprising four elements arranged in two pairs symmetrically arranged on opposite sides of a central space, along the optical axis, the elements being arranged as a first positive element I, a second negative element II, a third negative element III and a fourth positive element IV, the first and fourth elements being symmetrical and the second and third elements being symmetrical, the four elements being formed of plastic material having low indices of refraction, each of the four elements having at least one surface that is aspherical to compensate for the low index of refraction of the element materials and the lens system providing unitary magnification, being free of vignetting and providing an aperture of the order of f/5.6 and a field angle F/A. of the order of 64°, each element being a meniscus having its concave surface facing toward the central space, the lens surfaces being described, respectively, by radii $R_1$ through $R_6$, each element having a thickness along the optical axis of, respectively, $T_1$ through $T_4$, the distances that the lens elements are spaced apart being described by the spacings $S_1$ through $S_4$ with $S_2$ and $S_3$ describing the spacings from said central space, the elements having indices of refraction $n_d$, Abbe numbers $V_d$ and the lens system having a focal length F, the parameters of said system being

| LENS | RADII | SPACE AND THICKNESS | Nd | Vd |
|---|---|---|---|---|
| | F = 168 | f/5.6 | F.A. = 64° | |
| I | $R_1 = +27.80$ | $T_1 = 14.80$ | 1.492 | 57.40 |
| | $R_2 = +63.30$ | | | |
| | | $S_1 = .05$ | | |
| II | $R_3 = +41.68$ | $T_2 = 3.09$ | 1.590 | 30.9 |
| | $R_4 = +24.45$ | | | |
| | | $S_2 = 10.93$ | | |
| STOP | | $S_3 = 10.93$ | | |
| III | $R_5 = -24.45$ | $T_3 = 3.09$ | 1.590 | 30.9 |
| | $R_6 = -41.68$ | | | |
| | | $S_4 = .05$ | | |
| IV | $R_7 = -63.30$ | $T_4 = 14.80$ | 1.492 | 57.4 |
| | $R_8 = -27.80$ | | | | the surface described by radius $R_1$ being aspheric with the equation being:

$$X = \frac{Y^2}{27.80 + 27.80\sqrt{1 - 1.209\left[\frac{Y}{27.80}\right]^2}} + AY^4 + BY^6$$

where:
$A = +3.215 \times 10^{-8}$,
$B = -3.603 \times 10^{-11}$,
X represents a distance in the advancing direction of a ray on the optical axis, and
Y represents a distance in the direction perpendicular to the X direction;
the surface described by radius $R_4$ being aspheric with the equation being:

$$X = \frac{Y^2}{24.45 + 24.45\sqrt{1 - 1.881\left[\frac{Y}{24.51}\right]^2}} + AY^4 + BY^6$$

where:
$A = -1.398 \times 10^{-6}$,
$B = -6.45 \times 10^{-9}$, and
X and Y are as above;
the surfaces described by radii $R_4$ and $R_5$ being mirror images of one another as are the surfaces described by radii $R_1$ and $R_8$; and
lens elements I and IV being made of an acrylic material, specifically, polymethylmethacrylate, while elements II and III are made of a polystyrene material.

6. The device of claim 5 including means providing a folded optical path extending downward from the object platen, horizontally through the lens system and upward to the exposure means.

7. An electrostatic imaging device comprising:
(A) an object platen adapted to receive thereon a document to be reproduced;
(B) illumination means for illuminating evenly the object platen to form a light image of the document;
(C) exposure means at which a charged member is exposed to the light image of said document to form thereon a latent electrostatic image of the document; and
(D) a lens system for gathering and transmitting the light image of said document from said object platen to said exposure station, said lens system comprising four elements arranged in two pairs symmetrically arranged on opposite sides of a central space, along the optical axis, the elements being arranged as a first positive element I, a second negative element II, a third negative element III and a fourth positive element IV, the first and fourth elements being symmetrical and the second and third elements being symmetrical, the four elements being formed of plastic material having low indices of refraction, each of the four elements having at least one surface that is aspherical to compensate for the low index of refraction of the element materials and the lens system providing unitary magnification, being free of vignetting and providing an aperture of the order of f/5.6 and a field angle F.A. of the order of 64°, each element being a meniscus having its concave surface facing toward the central space, the lens surfaces being described, respectively, by radii $R_1$ through $R_6$, each element having a thickness along the optical axis of, respectively, $T_1$ through $T_4$, the distances that the lens elements are spaced apart being described by the spacings $S_1$ through $S_4$ with $S_2$ and $S_3$ describing the spacings from said central space, the elements having indices of refraction $n_d$, Abbe numbers $V_d$ and the lens system having a focal length F, the parameters of said system being

| LENS | RADII | SPACE AND THICKNESS | Nd | Vd |
|---|---|---|---|---|
| | F = 168 | f/5.6 | F.A. = 64° | |
| I | $R_1 = +27.46$ | $T_1 = 14.00$ | 1.492 | 57.4 |
| | $R_2 = +78.10$ | | | |

-continued

| LENS | RADII | F = 168<br>SPACE AND<br>THICKNESS | f/5.6<br>Nd | F.A. = 64°<br>Vd |
|---|---|---|---|---|
| | | $S_1 = .50$ | | |
| II | $R_3 = +47.01$ | $T_2 = 3.51$ | 1.590 | 30.9 |
| | $R_4 = +25.61$ | | | |
| | | $S_2 = 8.65$ | | |
| STOP | | | | |
| | | $S_3 = 8.65$ | | |
| III | $R_5 = -24.61$ | $T_3 = 3.51$ | 1.590 | 30.9 |
| | $R_6 = -47.01$ | | | |
| | | $S_4 = .50$ | | |
| IV | $R_7 = -78.10$ | $T_4 = 14.00$ | 1.492 | 57.4 |
| | $R_8 = -27.46$ | | | | the surface described by radius $R_1$ being aspheric, with its equation being:

$$X = \frac{Y^2}{29.46 + 29.46\sqrt{1 - 1.177\left[\frac{Y}{29.46}\right]^2}} + AY^4 + BY^6$$

where:
A = +6.397×10⁻⁹,
B = −7.748×10⁻¹¹,
X represents a distance in the advancing direction of a ray on the optical axis, and
Y represents a distance in the direction perpendicular to the X direction;
the surface described by radius $R_4$ being aspheric, with the equation being:

$$X = \frac{Y^2}{24.51 + 24.51\sqrt{1 - 1.692\left[\frac{Y}{24.51}\right]^2}} + AY^4 + BY^6$$

where:
A = −1.3497×10⁻⁶,
B = −5.004×10⁻⁹, and
X and Y are as above; and
the surfaces described by radii $R_4$ and $R_5$ being mirror images of one another as are the surfaces described by the radii $R_1$ and $R_8$.

8. An electrostatic imaging device comprising:
(A) an object platen adapted to receive thereon a document to be reproduced;
(B) illumination means for illuminating evenly the object platen to form a light image of the document;
(C) exposure means at which a charged member is exposed to the light image of said document to form thereon a latent electrostatic image of the document; and
(D) a lens system for gathering and transmitting the light image of said document from said object platen to said exposure station, said lens system comprising four elements arranged in two pairs symmetrically arranged on opposite sides of a central space, along the optical axis, the elements being arranged as a first positive element I, a second negative element II, a third negative element III and a fourth positive element IV, the first and fourth elements being symmetrical and the second and third elements being symmetrical, the four elements being formed of plastic material having low indices of refraction, each of the four elements having at least one surface that is aspherical to compensate for the low index of refraction of the element materials and the lens system providing unitary magnification, being free of vignetting and providing an aperture of the order of f/5.6 and a field angle F.A. of the order of 64°, each element being a meniscus having its concave surface facing toward the central space, the lens surfaces being described, respectively, by radii $R_1$ through $R_6$, each element having a thickness along the optical axis of, respectively, $T_1$ through $T_4$, the distances that the lens elements are spaced apart being described by the spacings $S_1$ through $S_4$ with $S_2$ and $S_3$ describing the spacings from said central space, the elements having indices of refraction $n_d$, Abbe numbers $V_d$ and the lens system having a focal length F, the parameters of said system being

| LENS | RADII | F = 168.46<br>SPACE AND<br>THICKNESS | f/5.6<br>Nd | F.A. = 64°<br>Vd |
|---|---|---|---|---|
| I | $R_1 = +33.23$ | $T_1 = 17.47$ | 1.492 | 57.4 |
| | $R_2 = +82.88$ | | | |
| | | $S_1 = 0.20$ | | |
| II | $R_3 = +46.98$ | $T_2 = 5.00$ | 1.585 | 29.9 |
| | $R_4 = +27.84$ | | | |
| | | $S_2 = 11.88$ | | |
| STOP | | | | |
| | | $S_3 = 11.88$ | | |
| III | $R_5 = -27.84$ | $T_3 = 5.00$ | 1.585 | 29.9 |
| | $R_6 = -46.98$ | $S_4 = 0.20$ | | |
| IV | $R_7 = -82.88$ | $T_4 = 17.47$ | 1.492 | 57.4 |
| | $R_8 = -33.23$ | | | | the lens surface of element I described by radius $R_1$ being aspheric, with its equation being:

$$X = \frac{Y^2}{33.23 + 33.23\sqrt{1 - 1.149\left[\frac{Y}{33.23}\right]^2}} + AY^4 + BY^6 + CY^8 + DY^{10}$$

where:
A = −1.461×10⁻⁸,
B = +3.267×10⁻¹⁰,
C = −3.611×10⁻¹³,
D = +3.205×10⁻¹⁶,
X represents a distance in the advancing direction of a ray on the optical axis, and
y represents a distance in the direction perpendicular to the X direction;
the lens surface of element II described by radius $R_4$ being also aspheric, with its equation being:

$$X = \frac{Y^2}{27.84 + 27.84\sqrt{1 - 1.718\left[\frac{Y}{27.84}\right]^2}} + AY^4 + BY^6 + CY^8 + DY^{10}$$

where:
A = −8.482×10⁻⁷,
B = −2.176×10⁻¹⁰,
C = −2.693×10⁻¹²,
D = +1.156×10⁻¹⁵,
X represents a distance in the advancing direction of a ray on the optical axis, and
Y represents a distance in the direction perpendicular to the X direction;

the surfaces described by radii $R_4$ and $R_5$ being mirror images of one another and the surfaces described by radii $R_1$ and $R_8$ being mirror images of one another, and lens elements I and IV being made of an acrylic material, specifically, polymethylmethacrylate, while elements II and III are made of a polycarbonate material.

9. An elastrostatic imaging device comprising:

(A) an object platen adapted to received thereon a document to be reproduced;

(B) illumination means for illuminating evenly the object platen to form a light image of the document;

(C) exposure means at which a charged member is exposed to the light image of said document to form thereon a latent electrostatic image of the document; and (D) a lens system for gathering and transmitting the light image of said document from said object platen to said exposure station, said lens system comprising four elements arranged in two pairs symmetrically arranged on opposite sides of a central space, along the optical axis the elements being arranged as a first positive element I, a second negative element II, a third negative element III and a fourth positive element IV, the first and fourth elements being symmetrical and the second and third elements being symmetrical, the four elements being formed of plastic material having low indices of refraction, each of the four elements having at least one surface that is aspherical to compensate for the low index of refraction of the element materials and the lens system providing unitary magnification, being free of vignetting and providing an aperture of the order of f/5.6 and a field angle F.A. of the order of 64°, each element being a meniscus having its concave surface facing toward the central space, the lens surfaces being described, respectively, by radii $R_1$ through $R_6$, each element having a thickness along the optical axis of, respectively, $T_1$ through $T_4$, the distances that the lens elements are spaced apart being described by the spacings $S_1$ through $S_4$ with $S_2$ and $S_3$ describing the spacings from said central space, the elements having indices of refraction $n_d$, Abbe numbers $V_d$ and the lens system having a focal length F, the parameters of said system being

| LENS | RADII | F = 168 SPACE AND THICKNESS | f/5.6 Nd | F.A. = 64° Vd |
|---|---|---|---|---|
| I | $R_1 = +27.46$ | $T_1 = 14.00$ | 1.492 | 57.4 |
|  | $R_2 = +78.10$ |  |  |  |
|  |  | $S_1 = .50$ |  |  |
| II | $R_3 = +47.01$ | $T_2 = 3.51$ | 1.590 | 30.9 |
|  | $R_4 = +25.61$ |  |  |  |
|  |  | $S_2 = 8.65$ |  |  |
| STOP |  |  |  |  |
|  |  | $S_3 = 8.65$ |  |  |
| III | $R_5 = -24.61$ | $T_3 = 3.51$ | 1.590 | 30.9 |
|  | $R_6 = -47.01$ |  |  |  |
|  |  | $S_4 = .50$ |  |  |
| IV | $R_7 = -78.10$ | $T_4 = 14.00$ | 1.492 | 57.4 |
|  | $R_8 = -27.46$ |  |  |  | the surface described by radius $R_1$ being aspheric with the describing equation being:

$$X = \frac{Y^2}{27.46 + 27.46\sqrt{1 - 1.243\left[\frac{Y}{27.46}\right]^2}}$$

the surface described by radius $R_2$ being aspheric with the describing equation being:

$$X = \frac{Y^2}{78.10 + 78.10\sqrt{1 - 5.241\left[\frac{Y}{78.10}\right]^2}}$$

the surface described by radius $R_3$ being aspheric with the describing equation being:

$$X = \frac{Y^2}{47.01 + 47.01\sqrt{1 - 2.333\left[\frac{Y}{47.01}\right]^2}}$$

the surface described by radius $R_4$ being aspheric with the describing equation being:

$$X = \frac{Y^2}{24.61 + 24.61\sqrt{1 - 1.912\left[\frac{Y}{24.61}\right]^2}}$$

where in the four preceding equations:
X represents a distance in the advancing direction of a ray on the optical axis; and
Y represents a distance in the direction perpendicular to the X direction; and
the surfaces described by the following radii being mirror images of one another as follows: $R_1$ and $R_8$, $R_2$ and $R_7$, $R_3$ and $R_6$ and $R_4$ and $R_5$.

10. For use in an electrophotographic imaging machine having an image of a document projected from an object platen to the photoconductive surface of an electrophotographic member substantially parallel to the object platen but offset therefrom while said photoconductive surface is located in an exposure plane interior of said machine, the machine including means providing a folded optical path of light energy such that the optical path extends downward from the object platen, horizontally, and then upward to the exposure plane, a lens system located in the horizontal portion of the optical path for gathering and transmitting light energy along the optical path, said lens system comprising: four elements arranged in two pairs symmetrically arranged on opposite sides of a central space, along the optical axis the elements being arranged as a first positive element I, a second negative element II, a third negative element III and a fourth positive element II, the first and fourth elements being symmetrical and the second and third elements being symmetrical, the four elements being formed of plastic materials having low indices of refraction, each of the four elements having at least one surface that is aspherical to compensate for the low index of refraction of the element materials and the lens system providing unitary magnification, being free of vignetting, and providing an aperature of the order of f/5.6 and a field angle F.A. of the order of 64°, and each element being a meniscus having its concave surface facing toward the central space, the lens surfaces being described, respectively, by radii $R_1$ through $R_8$, each element having a thickness along the optical axis of, respectively, $T_1$ through $T_4$, the distances that the lens elements are spaced apart being described by the spacings $S_1$ through $S_4$ with $S_2$ and $S_3$ describing the spacings from said central space, the elements having indices of refraction $n_d$, Abbe numbers $V_d$, and the lens system having a focal length F, the parameters of the lens system being

| | F = 168.46 | f/5.6 | F.A. = 64° | |
|---|---|---|---|---|
| LENS | RADII | SPACE AND THICKNESS | Nd | Vd |
| I | $R_1 = +33.23$ | $T_1 = 17.47$ | 1.492 | 57.4 |
| | $R_2 = +82.88$ | | | |
| | | $S_1 = 0.20$ | | |
| II | $R_3 = +46.98$ | $T_2 = 5.00$ | 1.585 | 29.9 |
| | $R_4 = +27.84$ | | | |
| | | $S_2 = 11.88$ | | |
| STOP | | | | |
| | | $S_3 = 11.88$ | | |
| III | $R_5 = -27.84$ | $T_3 = 5.00$ | 1.585 | 29.9 |
| | $R_6 = -46.98$ | $S_4 = 0.20$ | | |
| IV | $R_7 = -82.88$ | $T_4 = 17.47$ | 1.492 | 57.4 |
| | $R_8 = -33.23$ | | | | the lens surface of element I described by radius $R_1$ is aspheric, with its equation being:

$$X = \frac{Y^2}{33.23 + 33.23\sqrt{1 - 1.149\left[\frac{Y}{33.23}\right]^2}} + AY^4 + BY^6 + CY^8 + DY^{10}$$

where
$A = -1.461 \times 10^{-8}$,
$B = +3.267 \times 10^{-10}$,
$C = -3.611 \times 10^{-13}$,
$D = +3.205 \times 10^{-16}$,
X represents a distance in the advancing direction of a ray on the optical axis, and
Y represents a distance in the direction perpendicular to the X direction;
the lens surface of element II described by radius $R_4$ being also aspheric, with its equation being:

$$X = \frac{Y^2}{27.84 + 27.84\sqrt{1 - 1.718\left[\frac{Y}{27.84}\right]^2}} + AY^4 + BY^6 + CY^8 + DY^{10}$$

where:
$A = -8.482 \times 10^{-7}$,
$B = -2.176 \times 10^{-10}$,
$C = -2.693 \times 10^{-12}$,
$D = +1.156 \times 10^{-15}$,
X represents a distance in the advancing direction of a ray on the optical axis, and
Y represents a distance in the direction perpendicular to the X direction;
the surfaces described by radii $R_4$ and $R_5$ being mirror images of one another and the surfaces described by radii $R_1$ and $R_8$ are mirror images of one another, and
lens elements I and IV being made of an acrylic material, specifically, polymethylmethacrylate, while elements II and III are made of a polycarbonate material.

11. For use in an electrophotographic imaging machine having an image of a document projected from an object platen to the photoconductive surface of an electrophotographic member substantially parallel to the object platen but offset therefrom while said photoconductive surface is located in an exposure plane interior of said machine, the machine including means providing a folded optical path of light energy such that the optical path extends downward from the object platen, horizontally and then upward to the exposure plane, a lens system located in the horizontal portion of the optical path for gathering and transmitting light energy along the optical path, said lens system comprising: four elements arranged in two pairs symmetrically arranged on opposite sides of a central space, along the optical axis the elements being arranged as a first positive element I, a second negative element II, a third negative element III and a fourth positive element II, the first and fourth elements being symmetrical and the second and third elements being symmetrical, the four elements being formed of plastic materials having low indices of refraction, each of the four elements having at least one surface that is aspherical to compensate for the low index of refraction of the element materials and the lens system providing unitary magnification, being free of vignetting, and providing an aperture of the order of f/5.6 and a field angle F.A. of the order of 64°, and each element being a meniscus having its concave surface facing toward the central space, the lens surfaces being described, respectively, by radii $R_1$ through $R_8$, each element having a thickness along the optical axis of, respectively, $T_1$ through $T_4$, the distances that the lens elements are spaced apart being described by the spacings $S_1$ through $S_4$ with $S_2$ and $S_3$ describing the spacings from said central space, the elements having indices of refraction $n_d$, Abbe numbers $V_d$, and the lens system having a focal length F, the parameters of the system being

| | F = 168 | f/5.6 | F.A. = 64° | |
|---|---|---|---|---|
| LENS | RADII | SPACE AND THICKNESS | Nd | Vd |
| I | $R_1 = +29.46$ | $T_1 = 14.80$ | 1.492 | 57.4 |
| | $R_2 = +60.02$ | | | |
| | | $S_1 = .05$ | | |
| II | $R_3 = +38.06$ | $T_2 = 3.79$ | 1.585 | 29.9 |
| | $R_4 = +24.51$ | | | |
| | | $S_2 = 12.62$ | | |
| STOP | | | | |
| | | $S_3 = 12.62$ | | |
| III | $R_5 = -24.51$ | $T_3 = 3.79$ | 1.585 | 29.9 |
| | $R_6 = -38.06$ | | | |
| | | $S_4 = .05$ | | |
| IV | $R_7 = -60.02$ | $T_4 = 14.80$ | 1.492 | 57.4 |
| | $R_8 = -29.46$ | | | | the surface described by radius $R_1$ being aspheric, with its equation being:

$$X = \frac{Y^2}{29.46 + 29.46\sqrt{1 - 1.177\left[\frac{Y}{29.46}\right]^2}} + AY^4 + BY^6$$

where:
$A = +6.397 \times 10^{-9}$,
$B = -7.748 \times 10^{-11}$,

X represents a distance in the advancing direction of a ray on the optical axis, and Y represents a distance in the direction perpendicular to the X direction;

the surface described by radius $R_4$ being aspheric with the equation being:

TABLE III

| LENS | RADII | F = 168 SPACE AND THICKNESS | f/5.6 Nd | F.A. = 64° Vd |
|---|---|---|---|---|
| I | $R_1 = +27.80$ $R_2 = +63.30$ | $T_1 = 14.80$ | 1.492 | 57.40 |
| | | $S_1 = .05$ | | |
| II | $R_3 = +41.68$ $R_4 = +24.45$ | $T_2 = 3.09$ | 1.590 | 30.9 |
| | | $S_2 = 10.93$ | | |
| STOP | | $S_3 = 10.93$ | | |
| III | $R_5 = -24.45$ $R_6 = -41.68$ | $T_3 = 3.09$ | 1.590 | 30.9 |
| | | $S_4 = .05$ | | |
| IV | $R_7 = -63.30$ $R_8 = -27.80$ | $T_4 = 14.80$ | 1.492 | 57.4 | where:

$A = -1.3497 \times 10^{-6}$, $B = -5.004 \times 10^{-9}$, and

X and Y are as above; and the surfaces described by radii $R_4$ and $R_5$ being mirror images of one another as are the surfaces described by the radii $R_1$ and $R_8$.

12. For use in an electrophotographic imaging machine having an image of a document projected from an object platen to the photoconductive surface of an electrophotographic member substantially parallel to the object platen but offset therefrom while said photoconductive surface is located in an exposure plane interior of said machine, the machine including means providing a folded optical path of light energy such that the optical path extends downward from the object platen, horizontally and then upward to the exposure plane, a lens system located in the horizontal portion of the optical path for gathering and transmitting light energy along the optical path, said lens system comprising: four elements arranged in two pairs symmetrically arranged on opposite sides of a central space, along the optical axis, the elements being arranged as a first positive element I, a second negative element II, a third negative element III and a fourth positive element II, the first and fourth elements being symmetrical and the second elements being symmetrical, the four elements being formed of plastic materials having low indices of refraction, each of the four elements having at least one surface that is aspherical to compensate for the low index of refraction of the element materials and the lens system providing unitary magnification, being free of vignetting, and providing an aperture of the order of f/5.6 and a field angle F.A. of the order of 64°, and each element being a meniscus having its concave surface facing toward the central space, the lens surfaces being described, respectively, by radii $R_1$ through $R_8$, each element having a thickness along the optical axis of, respectively, $T_1$ through $T_4$, the distances that the lens elements are spaced apart being described by the spacings $S_1$ through $S_4$ with $S_2$ and $S_3$ describing the spacings from said central space, the elements having indices of refraction $n_d$, Abbe numbers $V_d$, and the lens system having a focal length F, the parameters of the lens system being

| LENS | RADII | F = 168 SPACE AND THICKNESS | f/5.6 Nd | F.A. = 64° Vd |
|---|---|---|---|---|
| I | $R_1 = +27.80$ $R_2 = +63.30$ | $T_1 = 14.80$ | 1.492 | 57.40 |
| | | $S_1 = .05$ | | |
| II | $R_3 = +41.68$ $R_4 = +24.45$ | $T_2 = 3.09$ | 1.590 | 30.9 |
| | | $S_2 = 10.93$ | | |
| STOP | | $S_3 = 10.93$ | | |
| III | $R_5 = -24.45$ $R_6 = -41.68$ | $T_3 = 3.09$ | 1.590 | 30.9 |
| | | $S_4 = .05$ | | |
| IV | $R_7 = -63.30$ $R_8 = -27.80$ | $T_4 = 14.80$ | 1.492 | 57.4 | the surface described by radius $R_1$ being aspheric with the equation being:

$$X = \frac{Y^2}{27.80 + 27.80\sqrt{1 - 1.209\left[\frac{Y}{27.80}\right]^2}} + AY^4 + BY^6$$

where:

$A = +3.215 \times 10^{-8}$, $B = -3.603 \times 10^{-11}$,

X represents a distance in the advancing direction of a ray on the optical axis, and Y represents a distance in the direction perpendicular to the X direction;

the surface described by radius $R_4$ being aspheric with the equation being:

$$X = \frac{Y^2}{24.45 + 24.45\sqrt{1 - 1.881\left[\frac{Y}{24.51}\right]^2}} + AY^4 + BY^6$$

where:

$A = -1.398 \times 10^{-6}$, $B = -6.45 \times 10^{-9}$, and

X and Y are as above;

the surfaces described by radii $R_4$ and $R_5$ being mirror images of one another as are the surfaces described by radii $R_1$ and $R_8$; and lens elements I and IV being made of an acrylic material, specifically, polymethylmethacrylate, while elements II and III are made of a polystyrene material.

13. For use in an electrophotographic imaging machine having an image of a document projected from an object platen to the photoconductive surface of an electrophotographic member substantially parallel to the object platen but offset therefrom while said photoconductive surface is located in an exposure plane interior of said machine, the machine including means providing a folded optical path of light energy such that the optical path extends downward from the object platen, horizontally and then upward to the exposure plane, a lens system located in the horizontal portion of the optical path for gathering and transmitting light energy along the optical path, said lens system comprising: four elements arranged in two pairs symmetrically arranged on opposite sides of a central space, along the optical axis the elements being arranged as a first positive element I, a second negative element II, a third negative element III and a fourth positive element II, the first and fourth elements being symmetrical and the second and third elements being symmetrical, the four elements being formed of plastic materials having low indices of refraction, each of the four elements having at least one surface that is aspherical to compensate for the low index of refraction of the element materials and the lens system providing unitary magnification, being free of vignetting, and providing an aperture of the order of f/5.6 and a field angle F.A. of the order of 64°, and each element being a meniscus having its concave surface facing toward the central space, the lens surfaces being described, respectively, by radii $R_1$ through $R_8$, each element having a thickness along the optical axis of, respectively, $T_1$ through $T_4$, the distances that the lens elements are spaced apart being described by the spacings $S_1$ through $S_4$ with $S_2$ and $S_3$ describing the spacings from said central space, the elements having indices of refraction $n_d$, Abbe numbers $V_d$, and the lens system having a focal length F, the parameters of the system being

| LENS | RADII | F = 168 SPACE AND THICKNESS | f/5.6 Nd | F.A. = 64° Vd |
|---|---|---|---|---|
| I | $R_1 = +27.46$ | $T_1 = 14.00$ | 1.492 | 57.4 |
|  | $R_2 = +78.10$ |  |  |  |
|  |  | $S_1 = .50$ |  |  |
| II | $R_3 = +47.01$ | $T_2 = 3.51$ | 1.590 | 30.9 |
|  | $R_4 = +25.61$ |  |  |  |
|  |  | $S_2 = 8.65$ |  |  |
| STOP |  |  |  |  |
|  |  | $S_3 = 8.65$ |  |  |
| III | $R_5 = -24.61$ | $T_3 = 3.51$ | 1.590 | 30.9 |
|  | $R_6 = -47.01$ |  |  |  |
|  |  | $S_4 = .50$ |  |  |
| IV | $R_7 = -78.10$ | $T_4 = 14.00$ | 1.492 | 57.4 |
|  | $R_8 = -27.46$ |  |  |  | the surface described by radius $R_1$ being aspheric with the describing equation being:

$$X = \frac{Y^2}{27.46 + 27.46\sqrt{1 - 1.243\left[\frac{Y}{27.46}\right]^2}}$$

the surface described by radius $R_2$ being aspheric with the describing equation being:

$$X = \frac{Y^2}{78.10 + 78.10\sqrt{1 - 5.241\left[\frac{Y}{78.10}\right]^2}}$$

the surface described by radius $R_3$ being aspheric with the describing equation being:

$$X = \frac{Y^2}{47.01 + 47.01\sqrt{1 - 2.333\left[\frac{Y}{47.01}\right]^2}}$$

the surface described by radius $R_4$ being aspheric with the describing equation being:

$$X = \frac{Y^2}{24.61 + 24.61\sqrt{1 - 1.912\left[\frac{Y}{24.61}\right]^2}}$$

where in the four preceding equations:
 X represents a distance in the advancing direction of a ray on the optical axis; and
 Y represents a distance in the direction perpendicular to the X direction; and
the surfaces described by the following radii are mirror images of one another as follows: $R_1$ and $R_8$, $R_2$ and $R_7$, $R_3$ and $R_6$ and $R_5$.

14. In a copier device having a platen for receiving a document or the like to be reproduced, means for illuminating the document, an electrophotographic member having a relatively flat portion that is adapted to be charged, exposed to a projected image of said document to form a latent image thereof on said flat portion, toned and moved to a transfer station to enable transfer of said toned image to a carrier and a projection system for forming the projected image of said document and projecting same to said flat portion, said projection system being a folded optical system including:
 an assembly of a plurality of synthetic resin lens elements, the number of elements being even and mounted on opposite sides of a central aperture plate, there being the same number of elements on each side and the elements on one side being mirror configurations of and symmetrical with respect to the respective elements on the other side, the lens system having a relatively low f number and a relatively wide field angle and being characterized by non-vignetting, at least some of the surface of the lens elements being aspherical and the parameters of the lens system being

| LENS | RADII | F = 168.46 SPACE AND THICKNESS | f/5.6 Nd | F.A. = 64° Vd |
|---|---|---|---|---|
| I | $R_1 = +33.23$ | $T_1 = 17.47$ | 1.492 | 57.4 |
|  | $R_2 = +82.88$ |  |  |  |
|  |  | $S_1 = 0.20$ |  |  |
| II | $R_3 = +46.98$ | $T_2 = 5.00$ | 1.585 | 29.9 |
|  | $R_4 = +27.84$ |  |  |  |
|  |  | $S_2 = 11.88$ |  |  |
| STOP |  |  |  |  |
|  |  | $S_3 = 11.88$ |  |  |
| III | $R_5 = -27.84$ | $T_3 = 5.00$ | 1.585 | 29.9 |
|  | $R_6 = -46.98$ | $S_4 = 0.20$ |  |  |
| IV | $R_7 = -82.88$ | $T_4 = 17.47$ | 1.492 | 57.4 |
|  | $R_8 = -33.23$ |  |  |  | the lens surface of element I described by radius $R_1$ being aspheric, with its equation being:

$$X = \frac{Y^2}{33.23 + 33.23\sqrt{1 - 1.149\left[\frac{Y}{33.23}\right]^2}} + AY^4 + BY^6 + CY^8 + DY^{10}$$

where
 $A = -1.461 \times 10^{-8}$,
 $B = +3.267 \times 10^{-10}$,
 $C = -3.611 \times 10^{-13}$,
 $D = +3.205 \times 10^{-16}$, X represents a distance in the advancing direction of a ray on the optical axis, and Y represents a distance in the direction perpendicular to the X direction;

the lens surface of element II described by radius $R_4$ being also aspheric, with its equation being:

$$X = \frac{Y^2}{27.84 + 27.84\sqrt{1 - 1.718\left[\frac{Y}{27.84}\right]^2}} + AY^4 + BY^6 + CY^8 + DY^{10}$$

where:
$A = -8.482 \times 10^{-7}$,
$B = -2.176 \times 10^{-10}$,
$C = -2.693 \times 10^{-12}$,
$D = +1.156 \times 10^{-15}$, X represents a distance in the advancing direction of a ray on the optical axis, and Y represents a distance in the direction perpendicular to the X direction;

the surfaces described by radii $R_4$ and $R_5$ being mirror images of one another and the surfaces described by radii $R_1$ and $R_8$ being mirror images of one another, and lens elements I and IV being made of an acrylic material, specifically, polymethylmethacrylate, while elements II and III are made of a polycarbonate material.

15. In a copier device having a platen for receiving a document or the like to be reproduced, means for illuminating the document, an electrophotographic member having a relatively flat portion that is adapted to be charged, exposed to a projected image of said document to form a latent image thereof on said flat portion, toned and moved to a transfer station to enable transfer of said toned image to a carrier and a projection system for forming the projected image of said document and projecting same to said flat portion, said projection system being a folded optical system including:

an assembly of a plurality of synthetic resin lens elements, the number of elements being even and mounted on opposite sides of a central aperture plate, there being the same number of elements on each side and the elements on one side being mirror configurations of and symmetrical with respect to the respective elements on the other side, the lens system having a relatively low f number and a relatively wide field angle and being characterized by non-vignetting, at least some of the surfaces of the lens elements being aspherical, and, the parameters of the lens system being

| LENS | RADII | F = 168 SPACE AND THICKNESS | f/5.6 Nd | F.A. = 64° Vd |
|---|---|---|---|---|
| I | $R_1 = +29.46$ | $T_1 = 14.80$ | 1.492 | 57.4 |
|  | $R_2 = +60.02$ |  |  |  |
|  |  | $S_1 = .05$ |  |  |
| II | $R_3 = +38.06$ | $T_2 = 3.79$ | 1.585 | 29.9 |
|  | $R_4 = +24.51$ |  |  |  |
|  |  | $S_2 = 12.62$ |  |  |
| STOP |  |  |  |  |
|  |  | $S_3 = 12.62$ |  |  |
| III | $R_5 = -24.51$ | $T_3 = 3.79$ | 1.585 | 29.9 |
|  | $R_6 = -38.06$ |  |  |  |
|  |  | $S_4 = .05$ |  |  |
| IV | $R_7 = -60.02$ | $T_4 = 14.80$ | 1.492 | 57.4 |

-continued

| LENS | RADII | F = 168 SPACE AND THICKNESS | f/5.6 Nd | F.A. = 64° Vd |
|---|---|---|---|---|
|  | $R_8 = -29.46$ |  |  |  | the surface described by radius $R_1$ being aspheric with its equation being:

$$X = \frac{Y^2}{29.46 + 29.46\sqrt{1 - 1.177\left[\frac{Y}{29.46}\right]^2}} + AY^4 + BY^6$$

where:
$A = +6.397 \times 10^{-9}$,
$B = -7.748 \times 10^{-11}$,

X represents a distance in the advancing direction of a ray on the optical axis, and Y represents a distance in the direction perpendicular to the X direction;

The surface described by radius $R_4$ being aspheric with the equation being:

$$X = \frac{Y^2}{24.51 + 24.51\sqrt{1 - 1.692\left[\frac{Y}{24.51}\right]^2}} + AY^4 + BY^6$$

where:
$A = -1.3497 \times 10^{-6}$,
$B = -5.004 \times 10^{-9}$, and

X and Y are as above; and the surfaces described by radii $R_4$ and $R_5$ being mirror images of one another as are the surfaces described by the radii $R_1$ and $R_8$.

16. In a copier device having a platen for receiving a document or the like to be reproduced, means for illuminating the document, an electrophotographic member having a relatively flat portion that is adapted to be charged, exposed to a projected image of said document to form a latent image thereof on said flat portion, toned and moved to a transfer station to enable transfer of said toned image to a carrier and a projection system for forming the projected image of said document and projecting same to said flat portion, said projection system being a folded optical system including:

an assembly of a plurality of synthetic resin lens elements, the number of elements being even and mounted on opposite sides of a central aperture plate, there being the same number of elements on each side and the elements on one side being mirror configurations of and symmetrical with respect to the respective elements on the other side, the lens system having a relatively low f number and a relative wide field angle and being characterized by non-vignetting, at least some of the surfaces of the lens elements being aspherical; and, the parameters of the system being

| LENS | RADII | F = 168 SPACE AND THICKNESS | f/5.6 Nd | F.A. = 64° Vd |
|---|---|---|---|---|
| I | $R_1 = +27.80$ | $T_1 = 14.80$ | 1.492 | 57.40 |
|  | $R_2 = +63.30$ |  |  |  |
|  |  | $S_1 = .05$ |  |  |

-continued-

| LENS | RADII | F = 168 SPACE AND THICKNESS | f/5.6 Nd | F.A. = 64° Vd |
|---|---|---|---|---|
| II | $R_3 = +41.68$ $R_4 = +24.45$ | $T_2 = 3.09$ | 1.590 | 30.9 |
| STOP | | $S_2 = 10.93$ $S_3 = 10.93$ | | |
| III | $R_5 = -24.45$ $R_6 = -41.68$ | $T_3 = 3.09$ | 1.590 | 30.9 |
| IV | $R_7 = -63.30$ $R_8 = -27.80$ | $S_4 = .05$ $T_4 = 14.80$ | 1.492 | 57.4 | the surface described by radius $R_1$ being aspheric with the equation being:

$$X = \frac{Y^2}{27.80 + 27.80\sqrt{1 - 1.209\left[\frac{Y}{27.80}\right]^2}} + AY^4 + BY^6$$

where:
$A = +3.215 \times 10^{-8}$,
$B = -3.603 \times 10^{-11}$,
X represents a distance in the advancing direction of a ray on the optical axis, and
Y represents a distance in the direction perpendicular to the X direction;
the surface described by radius $R_4$ being aspheric with the equation being:

$$X = \frac{Y^2}{24.45 + 24.45\sqrt{1 - 1.881\left[\frac{Y}{24.51}\right]^2}} + AY^4 + BY^6$$

where:
$A = -1.398 \times 10^{-6}$,
$B = -6.45 \times 10^{-9}$, and
X and Y are as above;
the surfaces described by radii $R_4$ and $R_5$ being mirror images of one another as are the surfaces described by radii $R_1$ and $R_8$; and
lens elements I and IV being made of an acrylic material, specifically, polymethylmethacrylate, while elements II and III are made of a polystyrene material.

17. In a copier device having a platen for receiving a document or the like to be reproduced, means for illuminating the document, an electrophotographic member having a relatively flat portion that is adapted to be charged, exposed to a projected image of said document to form a latent image thereof on said flat portion, toned and moved to a transfer station to enable transfer of said toned image to a carrier and a projection system for forming the projected image of said document and projecting same to said flat portion, said projection system being a folded optical system including:
an assembly of a plurality of synthetic resin lens elements, the number of elements being even and mounted on opposite sides of a central aperture plate, there being the same number of elements on each side and the elements on one side being mirror configurations of and symmetrical with respect to the respective elements on the other side, the lens system having a relatively low f number and a relative wide field angle and being characterized by non-vignetting, at least some of the surfaces of the lens elements being aspherical, and, the parameters of the system being:

| LENS | RADII | F = 168 SPACE AND THICKNESS | f/5.6 Nd | F.A. = 64° Vd |
|---|---|---|---|---|
| I | $R_1 = +27.46$ $R_2 = +78.10$ | $T_1 = 14.00$ | 1.492 | 57.4 |
| II | $R_3 = +47.01$ $R_4 = +25.61$ | $S_1 = .50$ $T_2 = 3.51$ | 1.590 | 30.9 |
| STOP | | $S_2 = 8.65$ | | |
| III | $R_5 = -24.61$ $R_6 = -47.01$ | $S_3 = 8.65$ $T_3 = 3.51$ | 1.590 | 30.9 |
| IV | $R_7 = -78.10$ $R_8 = -27.46$ | $S_4 = .50$ $T_4 = 14.00$ | 1.492 | 57.4 | the surface described by radius $R_1$ being aspheric with the describing equation being:

$$X = \frac{Y^2}{27.46 + 27.46\sqrt{1 - 1.243\left[\frac{Y}{27.46}\right]^2}}$$

the surface described by radius $R_2$ being aspheric with the describing equation being:

$$X = \frac{Y^2}{78.10 + 78.10\sqrt{1 - 5.241\left[\frac{Y}{78.10}\right]^2}}$$

the surface described by radius $R_3$ being aspheric with the describing equation being:

$$X = \frac{Y^2}{47.01 + 47.01\sqrt{1 - 2.333\left[\frac{Y}{47.01}\right]^2}}$$

the surface described by radius $R_4$ being aspheric with the describing equation being:

$$X = \frac{Y^2}{24.61 + 24.61\sqrt{1 - 1.912\left[\frac{Y}{24.61}\right]^2}}$$

where in the four preceding equations:
X represents a distance in the advancing direction of a ray on the optical axis; and
Y represents a distance in the direction perpendicular to the X direction; and
the surfaces described by the following radii being mirror images of one another as follows: $R_1$ and $R_8$, $R_2$ and $R_7$, $R_3$ and $R_6$ and $R_4$ and $R_5$.

18. In a copier device having a platen for receiving a document or the like to be reproduced, means for illuminating the document, an electrophotographic member having a relatively flat portion that is adapted to be charged, exposed to a projected image of said document to form a latent image thereof on said flat portion, toned and moved to a transfer station to enable transfer of the toned image to a carrier and a projection system for forming the projected image of said document and projecting same to said flat portion, said projection system comprising:

(A) the platen being planar and transparent and directing the illuminated image of said document along a first path normal to the plane of said platen through said platen, (B) a first angled mirror aligned with said first path and arranged to reflect said illuminated and projected image along a second path generally parallel to the plane of said platen, (C) a lens system having its optical axis in alignment with said second path arranged to receive the projected image from said first angled mirror and pass the same through said lens system, said lens system comprising:

(i) an assembly of a plurality of synthetic resin lens elements, (ii) the number of elements being even and mounted on opposite sides of a central aperture plate, (iii) there being the same number of lens elements on each side and the elements being symmetrically located with respect to the respective elements on the other side, (iv) the lens system having a relatively low f number and a relatively wide field angle, (v) and being characterized by non-vignetting and the parameters of the lens system being

| F = 168.46 | | f/5.6 | F.A. = 64° | |
|---|---|---|---|---|
| LENS | RADII | SPACE AND THICKNESS | Nd | Vd |
| I | $R_1 = +33.23$ | $T_1 = 17.47$ | 1.492 | 57.4 |
| | $R_2 = +82.88$ | | | |
| | | $S_1 = 0.20$ | | |
| II | $R_3 = +46.98$ | $T_2 = 5.00$ | 1.585 | 29.9 |
| | $R_4 = +27.84$ | | | |
| | | $S_2 = 11.88$ | | |
| STOP | | | | |
| | | $S_3 = 11.88$ | | |
| III | $R_5 = -27.84$ | $T_3 = 5.00$ | 1.585 | 29.9 |
| | $R_6 = -46.98$ | $S_4 = 0.20$ | | |
| IV | $R_7 = -82.88$ | $T_4 = 17.47$ | 1.492 | 57.4 |
| | $R_8 = -33.23$ | | | | the lens surface of element I described by radius $R_1$ being aspheric, with its equation being:

$$X = \frac{Y^2}{33.23 + 33.23\sqrt{1 - 1.149\left[\frac{Y}{33.23}\right]^2}} + AY^4 + BY^6 + CY^8 + DY^{10}$$

where
$A = -1.461 \times 10^{-8}$,
$B = +3.267 \times 10^{-10}$,
$C = -3.611 \times 10^{-13}$,
$D = +3.205 \times 10^{-16}$,
X represents a distance in the advancing direction of a ray on the optical axis, and
Y represents a distance in the direction perpendicular to the X direction;
the lens surface of element II described by radius $R_4$ being also aspheric, with its equation being:

$$X = \frac{Y^2}{27.84 + 27.84\sqrt{1 - 1.718\left[\frac{Y}{27.84}\right]^2}} + AY^4 + BY^6 + CY^8 + DY^{10}$$

where:
$A = -8.482 \times 10^{-7}$,
$B = -2.176 \times 10^{-10}$,
$C = -2.693 \times 10^{-12}$,
$D = +1.156 \times 10^{-15}$,
X represents a distance in the advancing direction of a ray on the optical axis, and
Y represents a distance in the direction perpendicular to the X direction;
the surfaces described by radii $R_4$ and $R_5$ being mirror images of one another and the surfaces described by radii $R_1$ and $R_8$ being mirror images of one another, and
lens elements I and IV being made of an acrylic material, specifically, polymethylmethacrylate, while elements II and III are made of a polycarbonate material; and (D) a second angled mirror aligned with said path and arranged on the opposite side of the lens system from said first angled mirror, arranged to receive the projected image emerging from said lens system and to reflect the same along a third path substantially parallel to said first path, said third path being in alignment with said flat portion and generally normal thereto to enable said flat portion to receive the projected image from said second angled mirror.

19. In a copier device having a platen for receiving a document or the like to be reproduced, means for illuminating the document, an electrophotographic member having a relatively flat portion that is adapted to be charged, exposed to a projected image of said document to form a latent image thereof on said flat portion, toned and moved to a transfer station to enable transfer of the toned image to a carrier and a projection system for forming the projected image of said document and projecting same to said flat portion, said projection system comprising:

(A) the platen being planar and transparent and directing the illuminated image of said document along a first path normal to the plane of said platen through said platen, (B) a first angled mirror aligned with said first path and arranged to reflect said illuminated and projected image along a second path generally parallel to the plane of said platen, (C) a lens system having its optical axis in alignment with said second path arranged to receive the projected image from said first angled mirror and pass the said through said lens system, said lens system comprising:

(i) an assembly of a plurality of synthetic resin lens elements, (ii) the number of elements being even and mounted on opposite sides of a central aperture plate, (iii) there being the same number of lens elements on each side and the elements on one side being symmetrically located with respect to the respective elements on the other side, (iv) the lens system having a relatively low f number and a relatively wide field angle, (v) and being characterized by non-vignetting, the parameters of the lens system being

| LENS | RADII | F = 168 SPACE AND THICKNESS | f/5.6 Nd | F.A. = 64° Vd |
|------|-------|----------------------------|----------|---------------|
| I | $R_1 = +29.46$ | $T_1 = 14.80$ | 1.492 | 57.4 |
|   | $R_2 = +60.02$ | | | |
|   |   | $S_1 = .05$ | | |
| II | $R_3 = +38.06$ | $T_2 = 3.79$ | 1.585 | 29.9 |
|    | $R_4 = +24.51$ | | | |
|    |   | $S_2 = 12.62$ | | |
| STOP |   |   |   |   |
|    |   | $S_3 = 12.62$ | | |
| III | $R_5 = -24.51$ | $T_3 = 3.79$ | 1.585 | 29.9 |
|     | $R_6 = -38.06$ | | | |
|     |   | $S_4 = .05$ | | |
| IV | $R_7 = -60.02$ | $T_4 = 14.80$ | 1.492 | 57.4 |
|    | $R_8 = -29.46$ | | | | the surface described by radius $R_1$ being aspheric with its equation being:

$$X = \frac{Y^2}{29.46 + 29.46\sqrt{1 - 1.177\left[\frac{Y}{29.46}\right]^2}} + AY^4 + BY^6$$

where:
$A = +6.397 \times 10^{-9}$,
$B = -7.748 \times 10^{-11}$,
X represents a distance in the advancing direction of a ray on the optical axis, and
Y represents a distance in the direction perpendicular to the X direction;
the surface described by radius $R_4$ being aspheric with the equation being:

$$X = \frac{Y^2}{24.51 + 24.51\sqrt{1 - 1.692\left[\frac{Y}{24.51}\right]^2}} + AY^4 + BY^6$$

where:
$A = -1.3497 \times 10^{-6}$,
$B = -5.004 \times 10^{-9}$, and
X and Y are as above; and
the surfaces described by radii $R_4$ and $R_5$ being mirror images of one another as are the surfaces described by the radii $R_1$ and $R_8$ and, (D) a second angled mirror aligned with said path and arranged on the opposite side of the lens system from said first angled mirror, arranged to receive the projected image emerging from said lens system and to reflect the same along a third path substantially parallel to said first path, said third path being in alignment with said flat portion and generally normal thereto to enable said flat portion to receive the projected image from said second angled mirror.

20. In a copier device having a platen for receiving a document or the like to be reproduced, means for illuminating the document, an electrophotographic member having a relatively flat portion that is adapted to be charged, exposed to a projected image of said document to form a latent image thereof on said flat portion, toned and moved to a transfer station to enable transfer of the toned image to a carrier and a projection system for forming the projected image of said document and projecting same to said flat portion, said projection system comprising:

(A) the platen being planar and transparent and directing the illuminated image of said document along a first path normal to the plane of said platen through said platen, (B) a first angled mirror aligned with said first path and arranged to reflect said illuminated and projected image along a second path generally parallel to the plane of said platen, (C) a lens system having its optical axis in alignment with said second path arranged to receive the projected image from said first angled mirror and pass the same through said lens system, said lens system comprising:

(i) an assembly of a plurality of synthetic resin lens elements, (ii) the number of elements being even and mounted on opposite sides of a central aperture plate, (iii) there being the same number of lens elements on each side and the elements on one side being symmetrically located with respect to the respective elements on the other side, (iv) the lens system having a relatively low f number and a relatively wide field angle, (v) and being characterized by non-vignetting, the parameters of the system are:

| LENS | RADII | F = 168 SPACE AND THICKNESS | f/5.6 Nd | F.A. = 64° Vd |
|------|-------|----------------------------|----------|---------------|
| I | $R_1 = +27.80$ | $T_1 = 14.80$ | 1.492 | 57.40 |
|   | $R_2 = +63.30$ | | | |
|   |   | $S_1 = .05$ | | |
| II | $R_3 = +41.68$ | $T_2 = 3.09$ | 1.590 | 30.9 |
|    | $R_4 = +24.45$ | | | |
|    |   | $S_2 = 10.93$ | | |
| STOP |   | $S_3 = 10.93$ | | |
| III | $R_5 = -24.45$ | $T_3 = 3.09$ | 1.590 | 30.9 |
|     | $R_6 = -41.68$ | | | |
|     |   | $S_4 = .05$ | | |
| IV | $R_7 = -63.30$ | $T_4 = 14.80$ | 1.492 | 57.4 |
|    | $R_8 = -27.80$ | | | | the surface described by radius $R_1$ being aspheric with the equation being:

$$X = \frac{Y^2}{27.80 + 27.80\sqrt{1 - 1.209\left[\frac{Y}{27.80}\right]^2}} + AY^4 + BY^6$$

where:
$A = +3.215 \times 10^{-8}$,
$B = -3.603 \times 10^{-11}$,
X represents a distance in the advancing direction of a ray on the optical axis, and
Y represents a distance in the direction perpendicular to the X direction;
the surface described by radius $R_4$ being aspheric with the equation being:

$$X = \frac{Y^2}{24.45 + 24.45\sqrt{1 - 1.881\left[\frac{Y}{24.51}\right]^2}} + AY^4 + BY^6$$

where:
$A = -1.398 \times 10^{-6}$,
$B = -6.45 \times 10^{-9}$, and
X and Y are as above;

the surfaces described by radii $R_4$ and $R_5$ being mirror images of one another as are the surfaces described by radii $R_1$ and $R_8$; and lens elements I and IV being made of an acrylic material, specifically, polymethylmeth-acrylate, while elements II and III are made of a polystyrene material and (D) a second angled mirror aligned with said path and arranged on the opposite side of the lens system from said first angled mirror, arranged to receive the projected image emerging from said lens system and to reflect the same along a third path substantially parallel to said first path, said third path being in alignment with said flat portion and generally normal thereto to enable said flat portion to receive the projected image from said second angled mirror.

21. In a copier device having a platen for receiving a document or the like to be reproduced, means for illuminating the document, an electrophotographic member having a relatively flat portion that is adapted to be charged, exposed to a projected image of said document to form a latent image thereof on said flat portion, toned and moved to a transfer station to enable transfer of the toned image to a carrier and a projection system for forming the projected image of said document and projecting same to said flat portion, said projection system comprising:

(A) the platen being planar and transparent and directing the illuminated image of said document along a first path normal to the plane of said platen through said platen, (B) a first angled mirror aligned with said first path and arranged to reflect said illuminated and projected image along a second path generally parallel to the plane of said platen, (C) a lens system having its optical axis in alignment with said second path arranged to receive the projected image from said first angled mirror and pass the same through said lens system, said lens system comprising:

(i) an assembly of a plurality of synthetic resin lens elements, (ii) the number of elements being even and mounted on opposite sides of a central aperture plate, (iii) there being the same number of lens elements on each side and the elements on one side symmetrically located with respect to the respective elements on the other side, (iv) the lens system having a relatively low f number and a relatively wide field angle, (v) and being characterized by non-vignetting, the parameters of the system being $F = 168$    $f/5.6$    $F.A. = 64°$

| LENS | RADII | SPACE AND THICKNESS | Nd | Vd |
|---|---|---|---|---|
| I | $R_1 = +27.46$ | $T_1 = 14.00$ | 1.492 | 57.4 |
|   | $R_2 = +78.10$ | | | |
|   |   | $S_1 = .50$ | | |
| II | $R_3 = +47.01$ | $T_2 = 3.51$ | 1.590 | 30.9 |
|   | $R_4 = +25.61$ | | | |
|   |   | $S_2 = 8.65$ | | |
| STOP |   | $S_3 = 8.65$ | | |
| III | $R_5 = -24.61$ | $T_3 = 3.51$ | 1.590 | 30.9 |
|   | $R_6 = -47.01$ | | | |
|   |   | $S_4 = .50$ | | |
| IV | $R_7 = -78.10$ | $T_4 = 14.00$ | 1.492 | 57.4 |
|   | $R_8 = -27.46$ | | | | the surface described by radius $R_1$ being aspheric with the describing equation being:

$$X = \frac{Y^2}{27.46 + 27.46\sqrt{1 - 1.243\left[\frac{Y}{27.46}\right]^2}}$$

the surface described by radius $R_2$ being aspheric with the describing equation being:

$$X = \frac{Y^2}{78.10 + 78.10\sqrt{1 - 5.241\left[\frac{Y}{78.10}\right]^2}}$$

the surface described by radius $R_3$ being aspheric with the describing equation being:

$$X = \frac{Y^2}{47.01 + 47.01\sqrt{1 - 2.333\left[\frac{Y}{47.01}\right]^2}}$$

the surface described by radius $R_4$ being aspheric with the describing equation being:

$$X = \frac{Y^2}{24.61 + 24.61\sqrt{1 - 1.912\left[\frac{Y}{24.61}\right]^2}}$$

where in the four preceding equations:
X represents a distance in the advancing direction of a ray on the optical axis; and
Y represents a distance in the direction perpendicular to the X direction; and the surfaces described by the following radii being mirror images of one another: $R_1$ and $R_8$; $R_2$ and $R_7$, $R_3$ and $R_6$ and $R_4$ and $R_5$ and (D) a second angled mirror aligned with said path and arranged on the opposite side of the lens system from said first angled mirror, arranged to receive the projected image emerging from said lens system and to reflect the same along a third path substantially parallel to said first path, said third path being in alignment with said flat portion and generally normal thereto to enable said flat portion to receive the projected image from said second angled mirror.

* * * * *